United States Patent [19]
Nishino

[11] Patent Number: 5,680,184
[45] Date of Patent: Oct. 21, 1997

[54] COLOR LIQUID CRYSTAL DISPLAY DEVICE

[75] Inventor: Toshiharu Nishino, Tokyo, Japan

[73] Assignee: Casio Computer Co., Ltd., Tokyo, Japan

[21] Appl. No.: 419,470

[22] Filed: Apr. 10, 1995

[30] Foreign Application Priority Data

| Apr. 12, 1994 | [JP] | Japan | 6-073086 |
|---|---|---|---|
| Apr. 28, 1994 | [JP] | Japan | 6-111669 |
| May 23, 1994 | [JP] | Japan | 6-108460 |
| Jun. 10, 1994 | [JP] | Japan | 6-152671 |
| Jun. 28, 1994 | [JP] | Japan | 6-167544 |

[51] Int. Cl.⁶ .................... G02F 1/1335; G02F 1/1347
[52] U.S. Cl. ............................................. 349/78; 349/118
[58] Field of Search ................... 359/53, 73; 349/117, 349/118, 78

[56] References Cited

U.S. PATENT DOCUMENTS

| 4,080,046 | 3/1978 | Nishizaki | 359/73 |
|---|---|---|---|
| 4,241,339 | 12/1980 | Ushiyama | 359/53 |
| 5,124,824 | 6/1992 | Kozaki et al. | 359/53 |
| 5,440,413 | 8/1995 | Kikuchi et al. | 359/73 |
| 5,448,386 | 9/1995 | Watanabe et al. | 359/73 |
| 5,496,498 | 3/1996 | Toyooka et al. | 359/73 |

FOREIGN PATENT DOCUMENTS

| 1-219720 | 9/1989 | Japan | 359/53 |
|---|---|---|---|
| 1-230019 | 9/1989 | Japan | 350/334 |

*Primary Examiner*—William L. Sikes
*Assistant Examiner*—Charles Miller
*Attorney, Agent, or Firm*—Frishauf, Holtz, Goodman, Langer & Chick

[57] ABSTRACT

A pair of polarizing plates are arranged on both the sides of a liquid crystal cell in which liquid crystal molecules are aligned to be twisted, and two biaxial retardation plates serving as color adjusting optical elements are arranged between one of the polarizing plates and the liquid crystal cell. The biaxial retardation plates satisfy $$n_x > n_z > n_y$$

where $n_x$, $n_y$, and $n_z$ are refractive indexes in a direction in which a maximum refractive index is obtained on the plane of the biaxial retardation plates, a direction perpendicular to the direction in which the maximum refractive index is obtained on the plane, and a direction of thickness, respectively. The positions of maximum refractive index directions serving as the phase delay axes of the biaxial retardation plates are set to obtain a display color having a desired hue. A driving control circuit for changing a voltage applied to a liquid crystal such that the color of exit light, i.e., a display color is changed in accordance with a change in polarized state of light transmitted through the liquid crystal is connected to the liquid crystal cell.

25 Claims, 26 Drawing Sheets

| STATIC VOLTAGE (=EFFECTIVE VOLTAGE) | DISPLAY COLOR |
|---|---|
| V < 2.04<br>2.15 < V < 2.17<br>2.18 < V < 2.22<br>2.26 < V | WHITE<br>RED<br>BLUE<br>GREEN |

| STATIC VOLTAGE (=EFFECTIVE VOLTAGE) | DISPLAY COLOR |
|---|---|
| V < 2.04 | WHITE |
| 2.12 < V < 2.18 | RED |
| 2.19 < V < 2.21 | BLUE |
| 2.27 < V | GREEN |

| STATIC VOLTAGE (=EFFECTIVE VOLTAGE) | DISPLAY COLOR |
|---|---|
| V < 2.03<br>2.14 < V < 2.17<br>2.19 < V < 2.23<br>2.28 < V | WHITE<br>RED<br>BLUE<br>GREEN |

FIG.20A

| STATIC VOLTAGE (=EFFECTIVE VOLTAGE) | DISPLAY COLOR |
|---|---|
| V < 2.04<br>2.15 < V < 2.17<br>2.18 < V < 2.22<br>2.26 < V | WHITE<br>RED<br>BLUE<br>GREEN |

FIG.20B

COLOR LIQUID CRYSTAL DISPLAY DEVICE

BACKGROUND OF THE INVENTION

1. Field of the Invention

The present invention relates to a color liquid crystal display device for adjusting colored light obtained by the birefringence characteristics of a twisted nematic liquid crystal to light having a desired hue, thereby performing a color display.

2. Description of the Related Art

As a conventional display device for a television set, a personal computer, an electronic portable calculator, or the like, a liquid crystal display device is well known. Recently, color liquid crystal display devices capable of performing a chromatic display, such as a liquid crystal color television set and the color display of a computer terminal, have been widely used.

As a color liquid crystal display device, a transmission type color liquid crystal display device is generally used. In this device, a liquid crystal cell is sandwiched between a pair of polarizing plates, and a back light (illumination source) is disposed outside one of the polarizing plates. In this case, the liquid crystal cell is formed as follows. A pair of transparent substrates are disposed to oppose each other. Transparent electrodes are respectively formed on the opposing surfaces of the transparent substrates. A liquid crystal is then sealed between the transparent substrates. Color filters for selectively transmitting light components having specific wavelengths are disposed on one of the transparent substrates.

By ON/OFF-controlling the driving voltage applied between the pair of transparent electrodes, the emergence of light from the back light is controlled. Light from the back light is selectively transmitted through each color filter in the liquid crystal display device in the processing of passing therethrough. As a result, the transmitted light has a specific color. With the colored light transmitted through each color filter, a color display is performed.

A color filter, however, generally has a low transmittance. For this reason, in a color liquid crystal display device using the above-mentioned color filters, the loss of transmitted light is large, resulting in a dark display. Especially, in a reflection type liquid crystal display device widely used as the display section of an electronic portable calculator or a portable device such as a wristwatch, no special light source is arranged, and light is transmitted through each color filter twice before and after reflection and undergoes optical loss. Therefore, the resultant display becomes dark. That is, it is very difficult to practically perform a color display operation by using color filters.

In addition, a color filter demands high precision in dimensions, e.g., thickness, and in assembly, similar to other optical elements such as a polarizing plate, resulting in an increase in cost of the liquid crystal display device.

Furthermore, in a color liquid crystal display device using color filters, since one pixel can display only a color corresponding to the color of a color filter arranged for this pixel, the structure of the color liquid crystal display device is complicated with an increase in the number of pixels.

SUMMARY OF THE INVENTION

It is an object of the present invention to provide a color liquid crystal display device, having a simple structure, which is capable of increasing a light transmittance without using a color filter and obtaining a satisfactorily bright color display having a desired hue without using a backlight.

In order to achieve the above object, a color liquid crystal display device comprises, a pair of substrates, electrodes respectively formed on the opposing surfaces thereof and aligning films respectively provided on the opposing surfaces of the substrates to cover the electrodes, the aligning films being subjected to aligning treatments in predetermined directions, a liquid crystal layer arranged between the pair of substrates and having liquid crystal molecules aligned to be twisted at a predetermined twist angle from one substrate to the other substrate, a pair of polarizing plates, arranged outside the pair of substrates to sandwich the substrates, for linearly polarizing incident light and analyzing light elliptically polarized by a birefringence function to color exit light, voltage applying means, connected to the electrodes, for changing a voltage applied to the liquid crystal layer to change an aligned state of the liquid crystal molecules such that a color of the exit light is changed by a change in polarized state of light transmitted through the liquid crystal layer, and color adjusting optical element means, arranged between the pair of polarizing plates and having birefringence characteristics, for adjusting a hue of the exit light.

According to the color liquid crystal display device arranged as described above, when light is transmitted through the polarizing plate on an incident side, linearly polarized light is obtained. When the linearly polarized light is transmitted through the liquid crystal layer having birefringence characteristics, elliptically polarized light in which light components having different wavelengths are set in different states, respectively, is obtained. Of the wavelength light set in an elliptically polarized state, wavelength light having a large component (to be referred to as a transmission axis component hereinafter) along the transmission axis of the polarized plate on an exit side is easily transmitted through the polarized plates. For this reason, exit light transmitted through the polarizing plate on the exit side exhibits the color of wavelength light having a large component ratio. In this case, the elliptically polarized state of each wavelength light is changed in accordance with the molecule-aligned state of the liquid crystal layer. For this reason, when a voltage applied to the liquid crystal is changed to change the aligned state of the liquid crystal molecules, the color of exit light can be changed. An optical element (to be referred to as color adjusting optical element hereinafter) having birefringence characteristics for adjusting the hue of exit light to a desired hue is arranged between the pair of polarizing plates, thereby adjusting the elliptically polarized state and wavelength component ratio. Therefore, exit light having a desired hue can be obtained.

In the above color liquid crystal display device, when a so-called STN (Super Twisted Nematic) liquid crystal having a twist/alignment angle of 180° to 270° is used as a liquid crystal layer, two biaxial retardation plates may be arranged as the color adjusting optical elements. In this case, both the two biaxial retardation plates may be arranged between one of the polarizing plates and the substrate opposing the polarizing plate. Alternatively, one of the biaxial retardation plates may be arranged between one polarizing plate and the substrate opposing this polarizing plate, and the other biaxial retardation plate may be arranged between the other polarizing plate and the other substrate opposing to the other polarizing plate. A biaxial retardation plate used in the present invention satisfies $n_x > n_z > n_y$ where $n_x$, $n_y$, and $n_z$ are refractive indexes in a direction in which a maximum refractive index is obtained on a plane of the biaxial retardation plate, a direction perpendicular to the direction in which the maximum refractive index is obtained on the plane, and a direction of thickness, respectively. By using these values, a color display which can display three primary colors each having a high color purity and has a large angle of visibility and a decrease in color misregistration caused by a change in temperature can be obtained.

A complex refracting element having birefringence characteristics, a complex refractive index expressed by a complex number N which satisfies $N=n-ik$ where n and k are a refractive index and an absorption coefficient, respectively, and characteristics in which the absorption coefficient k is in inverse proportion to a wavelength of light can be preferably used as the color adjusting optical element. In this case, as the complex refracting element, an optical element which satisfies $N_X>N_Z>N_Y$ where $N_X$, $N_Y$, and $N_Z$ are complex refractive indexes in a direction in which a maximum refractive index is obtained on a plane of the complex refracting element, a direction perpendicular to the direction in which the maximum refractive index is obtained on the plane, and a direction of thickness, respectively, is preferably used. Two complex refracting elements each having such characteristics may be arranged between one of the pair of substrates and the polarizing plate opposing one substrate. Alternatively, one of the complex refracting elements may be arranged between one of the pair of substrates and the polarizing plate opposing the substrate, and the other of the complex refracting elements may be arranged between the other substrate and the other polarizing plate opposing to the other substrate. When the complex refracting elements are arranged as described above, a color display which can display three primary colors each having a high color purity, and especially display red having a high color purity, and has a large angle of visibility and a decrease in color misregistration caused by a change in temperature can be obtained.

Furthermore, as the color adjusting optical element, a twist-aligned retardation plate whose material molecules are aligned to be twisted from one surface of the twist-aligned retardation plate to the other surface of the twist-aligned retardation plate may be used. As the twist-aligned retardation plate, a twist-aligned retardation plate in which the direction of the twist/alignment angle of the material molecules has a direction reverse to that of the twist/alignment angle of the liquid crystal molecules and is equal to the twist/alignment angle of the liquid crystal molecules is preferably used. A twist-aligned retardation plate in which the direction of the twist/alignment angle of material molecules is set to be equal to that of the twist/alignment angle of the liquid crystal molecules, the sum of the twist/alignment angle of the liquid crystal molecules and the twist/alignment angle of the material molecules is set to be 230° to 270° may be stacked on one of the pair of substrates. In this case, two biaxial retardation plates may be arranged between the pair of polarizing plates. When the twist-aligned retardation plate are arranged adjacent to the liquid crystal layer as described above, a color image having a decrease in color misregistration caused by a change in temperature can be stably displayed. In addition, when the biaxial retardation plates are arranged, color misregistration can be reduced, and a field angle can be increased.

In the color liquid crystal display device, when a so-called TN (Twisted Nematic) liquid crystal having a twist/alignment angle of 80° to 120° is used as a liquid crystal layer, as a color adjusting optical element, a homeotropic liquid crystal cell which is constituted by sealing a liquid crystal material between a pair of transparent substrates each having an electrode and has liquid crystal molecules aligned perpendicularly to the substrate surfaces, or a homogeneous liquid crystal cell which is constituted by sealing a liquid crystal material between a pair of transparent substrates each having an electrode and has liquid crystal molecules aligned parallel to the substrate surfaces may be preferably used. When the liquid crystal cell having the electrodes is arranged as the color adjusting optical element as described above, a variety of displays can be obtained by arbitrarily changing a background color and a display color.

The above color liquid crystal display device is preferably used as a reflection type color liquid crystal display device having a reflecting plate.

The above object can also be achieved by a color liquid crystal display device comprising a pair of substrates having electrodes respectively formed on the opposing surfaces thereof and aligning films respectively provided on the opposing surfaces of the substrates to cover the electrodes, the aligning films being subjected to aligning treatments in predetermined directions, a liquid crystal layer arranged between the pair of substrates and having liquid crystal molecules aligned to be twisted at a predetermined twist/alignment angle from one substrate to the other substrate, a pair of polarizing plates, arranged outside the pair of substrates to sandwich the substrates, for linearly polarizing incident light and analyzing light elliptically polarized by a birefringence function to color exit light, voltage applying means, connected to the electrodes, for changing a voltage applied to the liquid crystal layer to change an aligned state of the liquid crystal molecules such that a color of the exit light is changed by a change in polarized state of light transmitted through the liquid crystal layer, and a complex refracting element arranged between the pair of polarizing plates and having birefringence characteristics, a complex refractive index expressed by a complex number N which satisfies $N=n-ik$ where n and k are a refractive index and an absorption coefficient, respectively, and characteristics in which the absorption coefficient k is in inverse proportion to a wavelength of light.

In this color liquid crystal display device, the twist/alignment angle of the liquid crystal molecules of the liquid crystal layer is preferably set to be 230° to 270°, and a product $\Delta n \cdot d$ of a refractive index anisotropy $\Delta n$ and a layer thickness d is preferably set to be 1,260 nm to 1,460 nm. In this case, a complex refracting element preferably satisfies $N_X>N_Z>N_Y$ where $N_X$, $N_Y$, and $N_Z$ are complex refractive indexes in a direction in which a maximum refractive index is obtained on a plane of the complex refracting element means, a direction perpendicular to the direction in which the maximum refractive index is obtained on the plane, and a direction of thickness, respectively. Two complex refracting elements are preferably arranged between one of the substrates and the polarizing plate opposing the substrate. In addition, the color liquid crystal display device is preferably used as a reflection type color liquid crystal display device having a reflecting plate.

The above object can also be achieved by a color liquid crystal display device comprising a pair of substrates having electrodes respectively formed on the opposite surfaces thereof and aligning films respectively provided on the opposing surfaces of the substrates to cover the electrodes, the aligning films being subjected to an aligning treatment in a predetermined direction, a liquid crystal layer arranged between the pair of substrates and having liquid crystal molecules aligned to be twisted at a predetermined twist/alignment angle from one substrate to the other substrate, a pair of polarizing plates, arranged outside the pair of substrates to sandwich the substrates, for linearly polarizing incident light and analyzing light elliptically polarized by a birefringence function to color exit light, voltage applying means, connected to the electrodes, for changing a voltage applied to the liquid crystal layer to change an aligned state of the liquid crystal molecules such that a color of the exit light is changed by a change in polarized state of light transmitted through the liquid crystal layer, and two biaxial retardation plates which are arranged between one polarizing plate of the pair of polarizing plates and one substrate of the pair of substrates opposing the one polarizing plate and satisfy $n_x > n_z > n_y$ where $n_x$, $n_y$, and $n_z$ are refractive indexes in a direction in which a maximum refractive index is obtained on a plane of the biaxial retardation plates, a direction perpendicular to the direction in which the maximum refractive index is obtained on the plane, and a direction of thickness, respectively.

In this color liquid crystal display device, the twist/alignment angle of the liquid crystal molecules of the liquid crystal layer is preferably set to be 230° to 270°, and a product $\Delta n \cdot d$ of a refractive index anisotropy $\Delta n$ and a layer thickness d is preferably set to be 1,250 nm to 1,450 nm. In this case, the color liquid crystal display device is preferably used as a reflection type color liquid crystal display device having a reflecting plate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 20A is a table showing the relationship between applied voltages and display colors in the color liquid crystal display device of the sixth embodiment;

FIG. 20B is a table showing the relationship between applied voltages and display colors in a color liquid crystal display device serving as a comparative example;

DETAILED DESCRIPTION OF THE PREFERRED EMBODIMENTS

Embodiments of the present invention will be described below with reference to FIGS. 1 to 28.

[First Embodiment]

The arrangement of a reflection type color liquid crystal display device using a simple matrix driving scheme according to the first embodiment of the present invention will be described below with reference to FIGS. 1 and 2.

Figure 1:
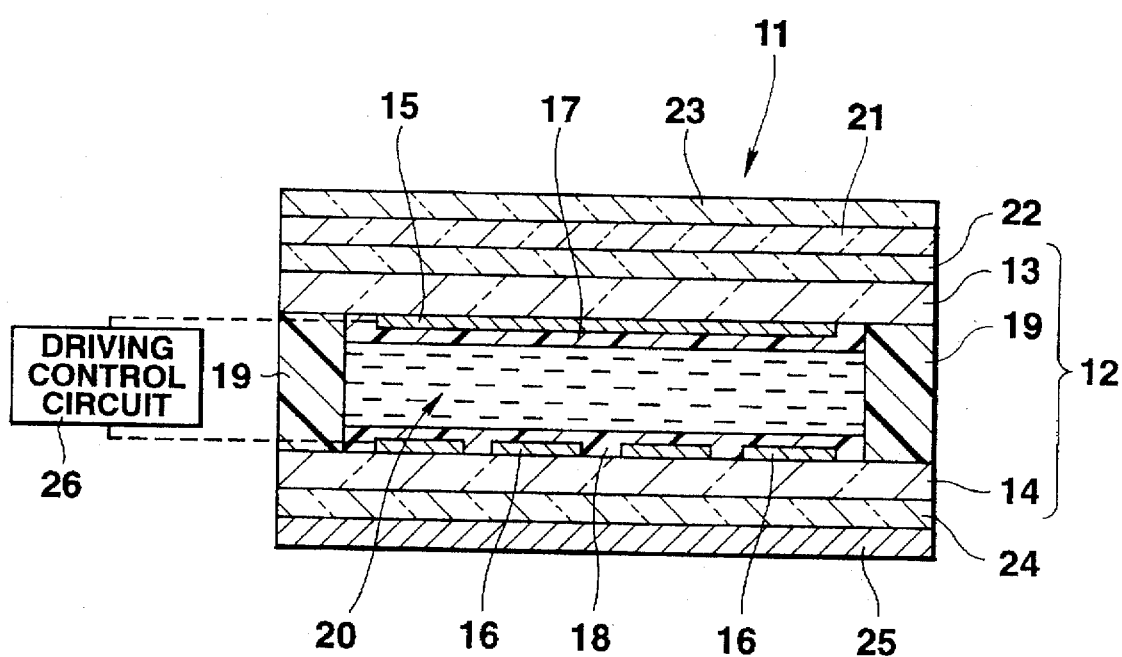
FIG. 1 is a sectional view showing a color liquid crystal display device as the first embodiment of the present invention.
Figure 2:
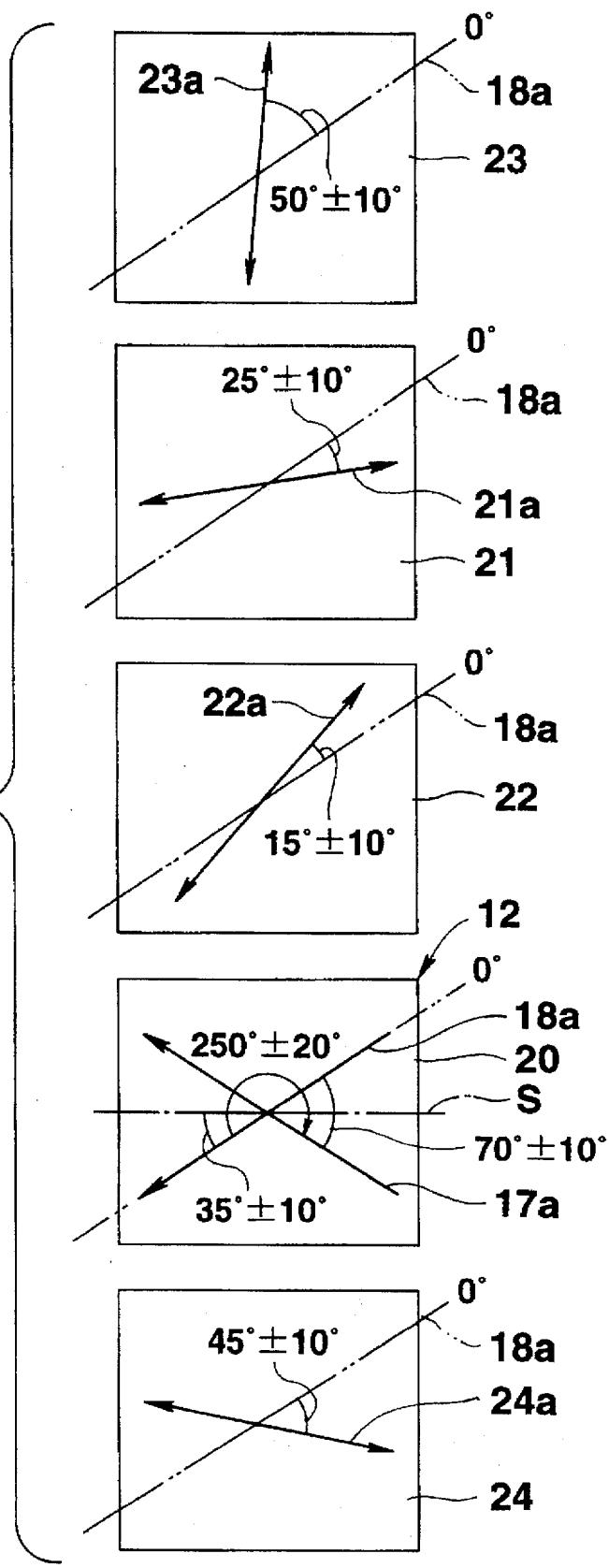
FIG. 2 is a view for explaining the positions/arrangement of the optical axes of optical elements in the first embodiment.

FIG. 1 is a sectional view showing the arrangement of a color liquid crystal display device 11 of this embodiment, and FIG. 2 is a plan view showing the positions of the optical axes of the color liquid crystal display device 11.

Referring to FIG. 1, a liquid crystal cell 12 is a twisted-nematic cell in which liquid crystal molecules have a large twist/alignment angle of 250°±20° (preferably ±10°). The liquid crystal cell 12 is constituted such that a first substrate (to be referred to as an upper Glass substrate hereinafter) 13 on an incident side and a second substrate (to be referred to as a lower glass substrate hereinafter) 14 on a reflecting side are arranged to oppose each other with a small gap (interval of several µm) in which a liquid crystal layer 20 is sealed. A plurality of scanning electrodes 15 and a plurality of signal electrodes 16, consisting of a transparent conductive material such as ITO (indium-tin oxide), are respectively arranged on the opposing surfaces of both the upper and lower Glass substrates 13 and 14 to cross each other.

Aligning films 17 and 18 are arranged on the front surfaces of the scanning electrodes 15 and the signal electrodes 16 arranged on the inner surfaces of the upper and lower glass substrates 13 and 14, respectively. The aligning films 17 and 18 are used to regulate a liquid crystal molecule aligning direction. The aligning films 17 and 18 are subjected to aligning treatments by a rubbing method or the like in which their front surfaces are rubbed with a cloth, thereby liquid crystal molecules adjacent to the aligning films 17 and 18 are aligned along the aligning treatment directions, respectively.

A seal member 19 is arranged in the peripheral portion between the upper and lower glass substrates 13 and 14 and keeps the predetermined interval between the upper and lower glass substrates to seal a liquid crystal in the area between the upper and lower glass substrates 13 and 14.

The liquid crystal layer 20 is compounded of a nematic liquid crystal containing a chiral liquid crystal, and the liquid crystal molecules are aligned to be twisted at a twist-aligned angle of 250°±20° (preferably ±10°) in accordance with the alignment regulating forces of the aligning films 17 and 18.

A product $\Delta n \cdot d$ of an optical anisotropy $\Delta n$ of the liquid crystal and a thickness d of the liquid crystal layer 20 is set to be 1,350 nm±100 nm, and preferably 1380 nm±30 nm.

A first retardation plate 21, is arranged outside a second retardation plate 22 arranged outside the upper glass substrate 13. Assume that a refractive index in a stretching axis direction (maximum refractive index direction) on the plane of the first retardation plate 21 is represented by nx, that the refractive index in the direction perpendicular to the stretching axis on the plane is represented by ny, and that the refractive index in the direction of thickness of the first retardation plate 21 is represented by nz. In this case, nx>nz>ny is satisfied. The first retardation plate 21 is a biaxial retardation plate. The product $\Delta n \cdot d$ of the refractive index anisotropy $\Delta n = nx - ny$ and the thickness d is set to be not less than 1500 nm, preferably 1600 nm±50 nm, and more preferably 1,600 nm ±30 nm, and an Rz value is set to be 0.3 to 0.7, and preferably 0.45±0.1.

Note that the Rz value is defined as follows:

$$Rz = (nx - nz)/(nx - ny) \quad \ldots (1)$$

The second retardation plate 22 is a biaxial retardation plate in which a product $\Delta n \cdot d$ is set to be not less than 1500 nm, and preferably 1,550 nm±30 nm, and an Rz value is set to be 0.3 to 0.7, and preferably 0.45±0.1.

The upper polarizing plate 23 arranged outside the first retardation plate 21 and the lower polarizing plate 24 arranged outside the lower glass substrate 14 shield (absorb) a polarized light component of incident light in an absorption axis direction, and transmit a polarized light component perpendicular to the absorption axis direction.

A reflecting plate 25 is arranged on the lower surface of the lower polarizing plate 24, and reflects, to the liquid crystal cell 12 side, light incident on the upper polarizing plate 23 and transmitted through the liquid crystal cell 12 and the lower polarizing plate 24.

A driving control circuit 26 serving as a voltage applying means is connected to the scanning electrodes 15 and the signal electrodes 16, and the driving control circuit 26 applies a voltage corresponding to input information to the liquid crystal layer 20. The birefringence effect of the liquid crystal layer 20 is changed in accordance with the applied voltage, thereby displaying a color image corresponding to the input information.

FIG. 2 illustrates a combination of the aligning treatment direction of the liquid crystal cell 12, the optical axes (phase advance or phase delay axis) of the retardation plates 21 and 22, and the transmission axes of the polarizing plates 23 and 24 using the plan view of the constituent elements.

Note that a two-dots line S in FIG. 2 is a reference line along the lateral direction of a display surface and is used for descriptive convenience.

As shown in FIG. 2, a direction 18a of aligning treatment performed for the lower aligning film 18 of the liquid crystal cell 12 is inclined by 35°±5° with respect to the reference line S, and liquid crystal molecules near the lower aligning film 18 are aligned along the aligning treatment direction 18a.

A direction 17a of aligning treatment performed for the upper aligning film 17 of the liquid crystal cell 12 is set to be a direction which crosses the aligning treatment direction 18a at 70°±10°, and the liquid crystal molecules near the upper aligning film 17 are aligned along the aligning treatment direction 17a.

In this manner, the liquid crystal molecules have an aligned state such that the liquid crystal molecules are twisted clockwise from the lower glass substrate 14 to the upper glass substrate 13 by 250°±20° (preferably ±10°).

A transmission axis 23a of the upper polarizing plate 23 is set to cross the aligning treatment direction 18a of the lower aligning film 18 at 50°±10° (85°±10° with respect to the reference line S).

The stretching axis (axis having a maximum refractive index on a plane) 21a of the first retardation plate 21 is set to cross the aligning treatment direction 18a of the lower aligning film 18 at 25°±10° (10°±10° with respect to the reference line S).

A stretching axis 22a of the second retardation plate 22 is set to cross the aligning treatment direction 18a of the lower aligning film 18 at 15°±10° (50°±10° with respect to the reference line S).

A transmission axis 24a of the lower polarizing plate 24 is set to cross the aligning treatment direction 18a of the lower aligning film 18 at 45°±10° (10°±10° with respect to the reference line S).

The coloring principle of the color liquid crystal display device with the above arrangement will be described below.

Light incident from the upper direction in FIG. 1 on the upper surface side of the color liquid crystal display device 11 is changed into linearly polarized light by transmitting the light through the upper polarizing plate 23. While the linearly polarized light is transmitted through the retardation plates 21 and 22, the linearly polarized light receives a polarizing function corresponding to retardation values and optical positioning conditions such as the positions of the stretching axes 21a and 22a of the retardation plates 21 and 22, thereby obtaining elliptically polarized light components whose polarized states are different from each other at the respective wavelengths. While these elliptically polarized light components having different wavelengths are transmitted through the liquid crystal cell 12, the elliptically polarized light components receive a polarizing function corresponding to the optical positioning conditions and retardation value of the liquid crystal cell 12, thereby changing their polarized states.

When the elliptically polarized light components which respectively have different polarized states at different wavelengths and receive the polarizing functions of the retardation plates 21 and 22 and the liquid crystal cell 12 are incident on the lower polarizing plate 24, a polarized light component which coincides with the transmission axis 24a of the lower polarizing plate 24 is transmitted through the lower polarizing plate 24.

The light transmitted through the lower polarizing plate 24 is reflected by the reflecting plate 25 and emerges from the upper surface side of the color liquid crystal display device 11 through a path reverse to the above optical path, thereby obtaining a display color having a wavelength in which the spectral intensity of the exit light represents a peak.

The retardation of each of the retardation plates 21 and 22 is determined depending on the product $\Delta n \cdot d$ of the refractive index anisotropy $\Delta n$ and thickness d of a corresponding one of the retardation plates 21 and 22, and the retardation of the liquid crystal cell 12 is determined depending on the aligned state of the liquid crystal molecules. Therefore, when the aligned state of the liquid crystal molecules is changed by changing the value of a voltage applied to the liquid crystal cell 12, the retardation of the liquid crystal cell 12 changes, the polarizing function of the liquid crystal cell 12 changes, and the hue and luminance of a display color change.

That is, the color liquid crystal display device with the arrangement shown in FIGS. 1 and 2 can display a color image by controlling the birefringence characteristics of the liquid crystal layer 20. Exit light obtained at that time can have a desired hue and luminance because the light has passed through the biaxial retardation plates 21 and 22 serving as color adjusting optical elements.

More specifically, when no voltage is applied across the scanning electrodes 15 and the signal electrodes 16, light incident on the color liquid crystal display device 11 receives the polarizing functions of the biaxial retardation plates 21 and 22 and a polarizing function corresponding to the initial aligned state of the liquid crystal molecules, thereby obtaining elliptically polarized light components whose polarized states are different from each other at the respective wavelengths. The color of light transmitted through the lower polarizing plate 24, reflected by the reflecting plate 25, and emerging from the upper surface side of the color liquid crystal display device 11 through the reverse path becomes a color corresponding to the retardations of the biaxial retardation plates 21 and 22 and the retardation of the liquid crystal layer 20 set in an initial aligned state.

When a voltage is applied across the electrodes 15 and 16 of the liquid crystal cell 12, and the value of the effective voltage is increased, the liquid crystal molecules are gradually raised from an initial twisted state. The retardation of the liquid crystal cell 12 changes in accordance with the raised aligned state, and light incident on the color liquid crystal display device 11 receives the polarizing functions of the retardation plates 21 and 22 and the polarizing function corresponding to the changed retardation of the liquid crystal cell 12, thereby obtaining elliptically polarized light components corresponding to these polarizing functions. For this reason, a display color obtained at that time is different from a display color obtained when no voltage is applied to the liquid crystal cell 12.

When a voltage having a magnitude at which the liquid crystal molecules are almost vertically aligned is applied to the liquid crystal cell 12, the retardation of the liquid crystal cell 12 becomes almost "0". Therefore, the polarizing function of the liquid crystal cell 12 is almost zero, and light incident on the color liquid crystal display device 11 is changed into only elliptically polarized light components corresponding to the polarizing functions of the biaxial retardation plates 21 and 22. The elliptically polarized light components emerge from the color liquid crystal display device 11 through the lower polarizing plate 24, the reflecting plate 25, and the reverse path thereof, and the light is colored with colors corresponding to the retardations of the biaxial retardation plates 21 and 22.

Therefore, according to the above embodiment, an effective voltage applied to the liquid crystal layer 20 is controlled by controlling a signal applied across the scanning electrodes 15 and the signal electrodes 16 to control the birefringence characteristics of the liquid crystal layer 20, thereby displaying a desired color.

According to the above arrangement, the retardation plates 21 and 22 each having a phase difference in the direction of thickness and optical biaxial properties are used. For this reason, the difference between a phase obtained when light is vertically transmitted through the liquid crystal layer 20 and a phase obtained when the light is obliquely transmitted through the liquid crystal layer 20 is compensated by transmitting the light through the biaxial retardation plates 21 and 22, thereby increasing a field angle.

A display color is obtained by not only the birefringence function of the liquid crystal layer 20 but also the birefringence functions of the two biaxial retardation plates 21 and 22. The two biaxial retardation plates 21 and 22 each having a birefringence function whose temperature dependency is smaller than that of the birefringence function of the liquid crystal layer 20 are used. For this reason, even when the retardation of the liquid crystal layer 20 is changed by a change in temperature, the change in retardation has a relatively small influence on the display color. Therefore, a variation in display color caused by a change in temperature can be reduced.

With an increase in voltage (effective voltage) applied to the liquid crystal layer 20, the display color is sequentially changed to white, red, blue, and green in an order named. Three primary colors and white can be displayed, so that a practical color image can be satisfactorily obtained.

EXAMPLE

As an example of the first embodiment, a color liquid crystal display device was formed under the following conditions. That is, the angles of the aligning treatment directions 17a and 18a of the aligning films 17 and 18, the stretching axes 21a and 22a of the biaxial retardation plates 21 and 22, and the transmission axes 23a and 24a of the polarizing plates 23 and 24 were respectively set to be the central angles shown in FIG. 2, the thickness d of the liquid crystal layer 20 was set to be 6,800 nm, and the value Δn·d was set to be 1,390 nm. A signal supplied to the scanning electrodes 15 and the signal electrodes 16 was controlled to statically drive the color liquid crystal display device.

Figures 3, 4:
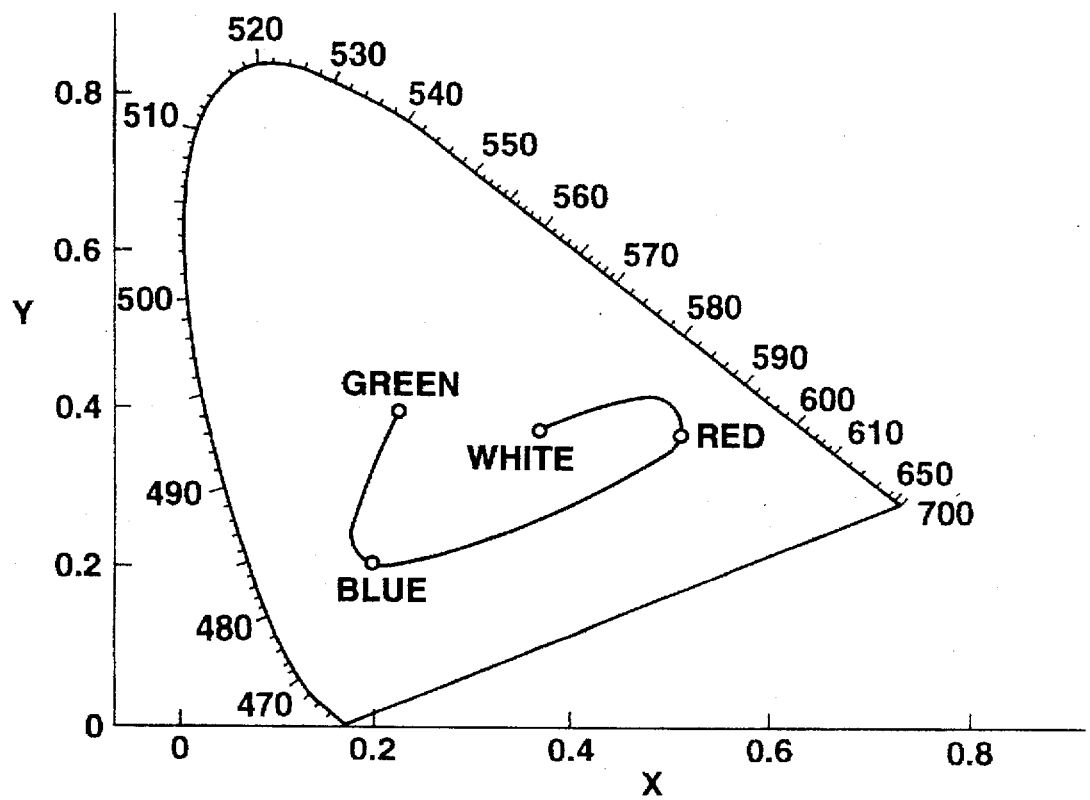
FIG. 3 is a table showing the relationship between applied voltages and display colors in the color liquid crystal display device of the first embodiment.
FIG. 4 is a CIE diagram showing a change in display color in the first embodiment.

In this case, as shown in FIG. 3, the display color of the color liquid crystal display device became white when the effective value of a static voltage, e.g., an applied voltage was less than 2.04 v, the display color became red when the effective value fell within the range between 2.15 V and 2.17 V, the display color became blue when the effective value fell within the range between 2.18 V and 2.22 V, and the display color became green when the effective value was more than 2.26 V. Each display color had a high color purity, as shown in the CIE diagram of FIG. 4.

In the color liquid crystal display device according to this example, a variation in display color caused by a change in temperature was small, and a wide field angle could be obtained.

Note that, in this embodiment, the two biaxial retardation plates may be arranged between the liquid crystal cell and the lower polarizing plate.

[Second Embodiment]

The second embodiment is obtained by changing the positions of two biaxial retardation plates in the first embodiment. The same reference numerals as in the first embodiment denote the same parts in the second embodiment, and a description thereof will be omitted.

Figure 5:
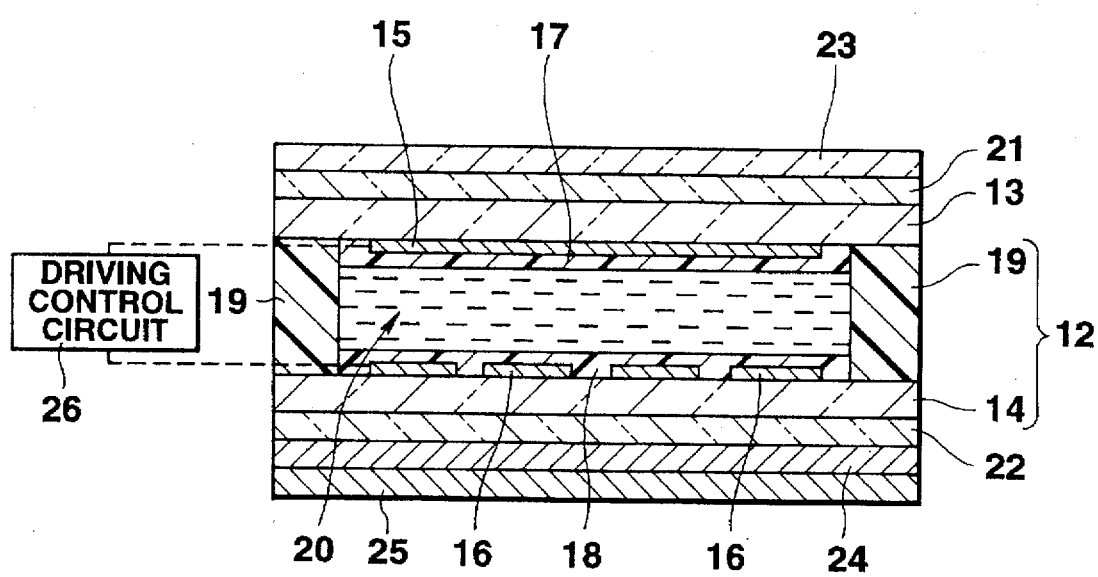
FIG. 5 is a sectional view showing a color liquid crystal display device as the second embodiment of the present invention.

In the first embodiment, the two biaxial retardation plates 21 and 22 are arranged between the upper glass substrate 13 and the upper polarizing plate 23. However, the positions of the biaxial retardation plates can be arbitrarily determined. For example, as shown in FIG. 5, a second retardation plate, i.e., an upper biaxial retardation plate 21 may be arranged between an upper glass substrate 13 and an upper polarizing plate 23, and a first retardation plate, i.e., a lower biaxial retardation plate 22 may be arranged between a lower glass substrate 14 and a lower polarizing plate 24.

Figure 6:
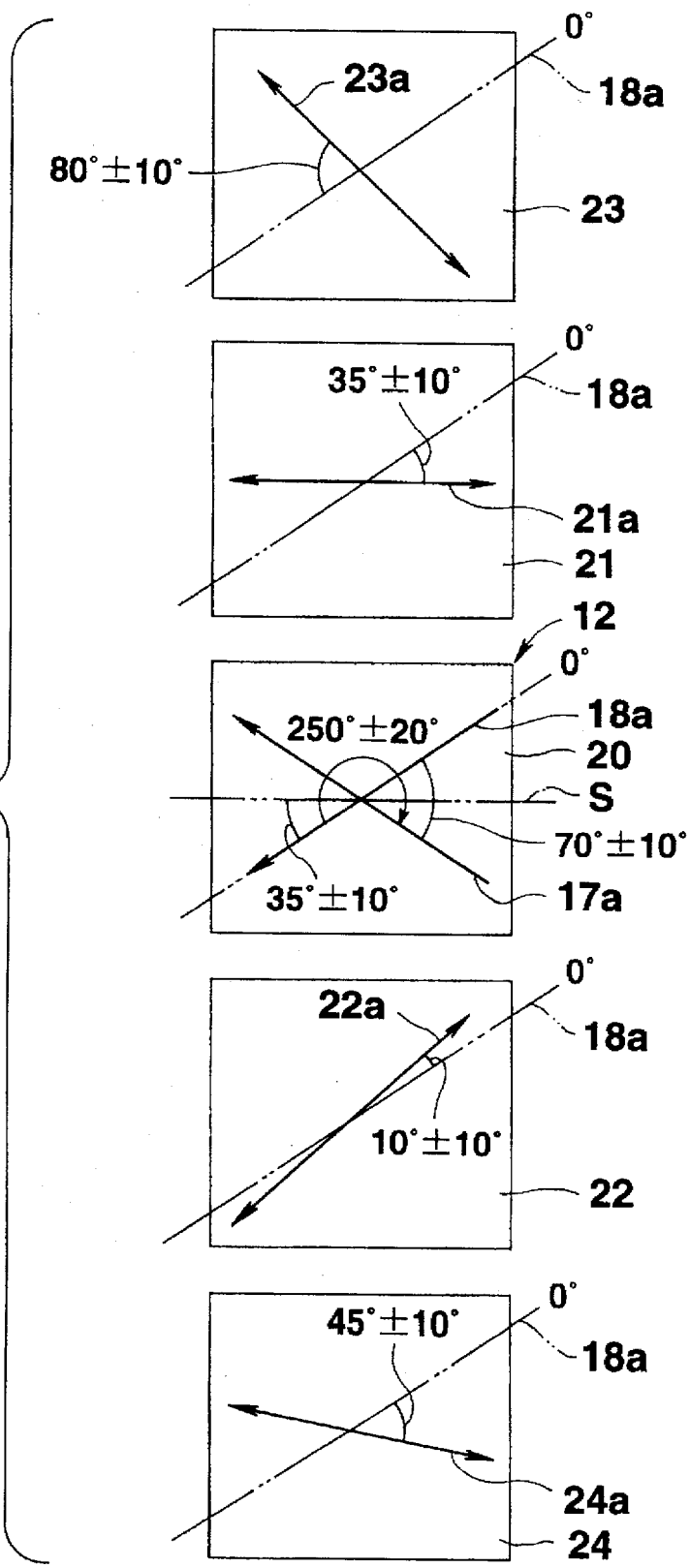
FIG. 6 is a view for explaining the positions/arrangement of the optical axes of optical elements in the second embodiment.

When the biaxial retardation plates 21 and 22 are arranged as described above, aligning treatment directions 17a and 18a of aligning films 17 and 18, stretching axes 21a and 22a of the biaxial retardation plates 21 and 22, and transmission axes 23a and 24a of the polarizing plates 23 and 24 are arranged as shown in FIG. 6.

As shown in FIG. 6, the direction 18a of aligning treatment performed for the lower aligning film 18 of the liquid crystal layer 12 is inclined by 35°±10° with respect to a reference line S, the direction 17a of aligning treatment performed for the upper aligning film 17 is set to be a direction which crosses the aligning treatment direction 18a at 70°±10°. Liquid crystal molecules are aligned to be twisted clockwise from the lower glass substrate 14 to the upper glass substrate 13 by 250°±20° (preferably ±10°).

As shown in FIG. 6, the transmission axis 23a of the upper polarizing plate 23 is set to cross the aligning treatment direction 18a of the lower aligning film 18 at 80°±10° (45°±10° with respect to the reference line S).

The stretching axis 21a of the biaxial retardation plate 21 is set to cross the aligning treatment direction 18a of the lower aligning film 18 at 35°±10° (0°±10° with respect to the reference line S).

The stretching axis 22a of the biaxial retardation plate 22 is set to cross the aligning treatment direction 18a of the lower aligning film 18 at 10°±10° (45°±10° with respect to the reference line S).

The transmission axis 24a of the lower polarizing plate 24 is set to cross the aligning treatment direction 18a of the lower aligning film 18 at 45°±10° (10°±10° with respect to the reference line S).

The biaxial retardation plate 21 has a value Δn·d of not less than 1500 nm, and preferably 1,600 nm±30 nm and an Rz value of 0.3 to 0.7 (preferably 0.45±0.1). A liquid crystal layer 20 has a value Δn·d of 1,350 nm ±100 nm, and preferably 1380 nm±30 nm. The biaxial retardation plate 22 has a value Δn·d of not less than 1500 nm, and preferably 1,600 nm±30 nm, and an Rz value of 0.3 to 0.7 (preferably 0.45±0.1).

According to the above arrangement, with an increase in voltage applied to the liquid crystal layer 20, the display color is sequentially changed to red, purple, white, bluish purple, and black in an order named. When a signal applied to scanning electrodes 15 and signal electrodes 16 is controlled to control the effective voltage applied to the liquid crystal layer 20 and control the display color, it is possible to display a color image. In addition, the two biaxial retardation plates 21 and 22 are used as retardation plates. For this reason, the difference between a phase obtained when the light is vertically transmitted through the liquid crystal layer 20 and a phase obtained when the light is obliquely transmitted through the liquid crystal layer 20 is compensated for by transmitting through the two biaxial retardation plates 21 and 22, thereby increasing an angle of visibility.

As an example of the second embodiment, the following color liquid crystal display device was formed. This color liquid crystal display device had the same arrangement as that of the example of the first embodiment except that the angles of the aligning treatment directions 17a and 18a of the aligning films 17 and 18, the stretching axes 21a and 22a of the biaxial retardation plates 21 and 22, and the transmission axes 23a and 24a of the polarizing plates 23 and 24 were respectively set to be the central angles shown in FIG. 6.

In the color liquid crystal display device, the display color became reddish purple when the effective value of an applied voltage was less than 2.32 v, the display color became white when the effective value fell within the range of 2.42 V to 2.60 V, the display color became bluish purple when the effective value fell within the range of 2.98 V to 3.02 V, and the display color became black when the effective value was 3.5 V or more. Therefore, a color image can be displayed.

As described above, according to the color liquid crystal display device of the second embodiment, as in the first embodiment, the voltage applied to the liquid crystal is controlled to control the display color. Therefore, an arbitrary color image can be displayed. In addition, an angle of visibility increases, and color misregistration or the like caused by a change in temperature can be reduced.

[Third Embodiment]

In the third embodiment, two complex refracting elements serving as color adjusting optical elements are arranged on one side of a liquid crystal cell.

Figure 7:
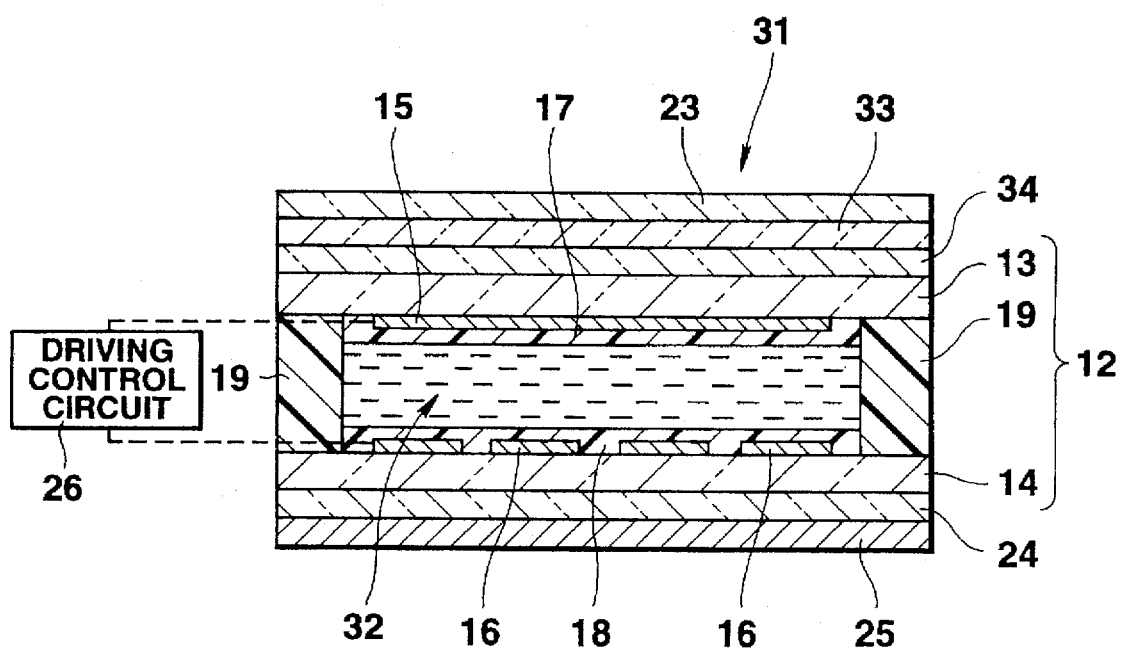
FIG. 7 is a sectional view showing a color liquid crystal display device as the third embodiment of the present invention.
Figure 8:
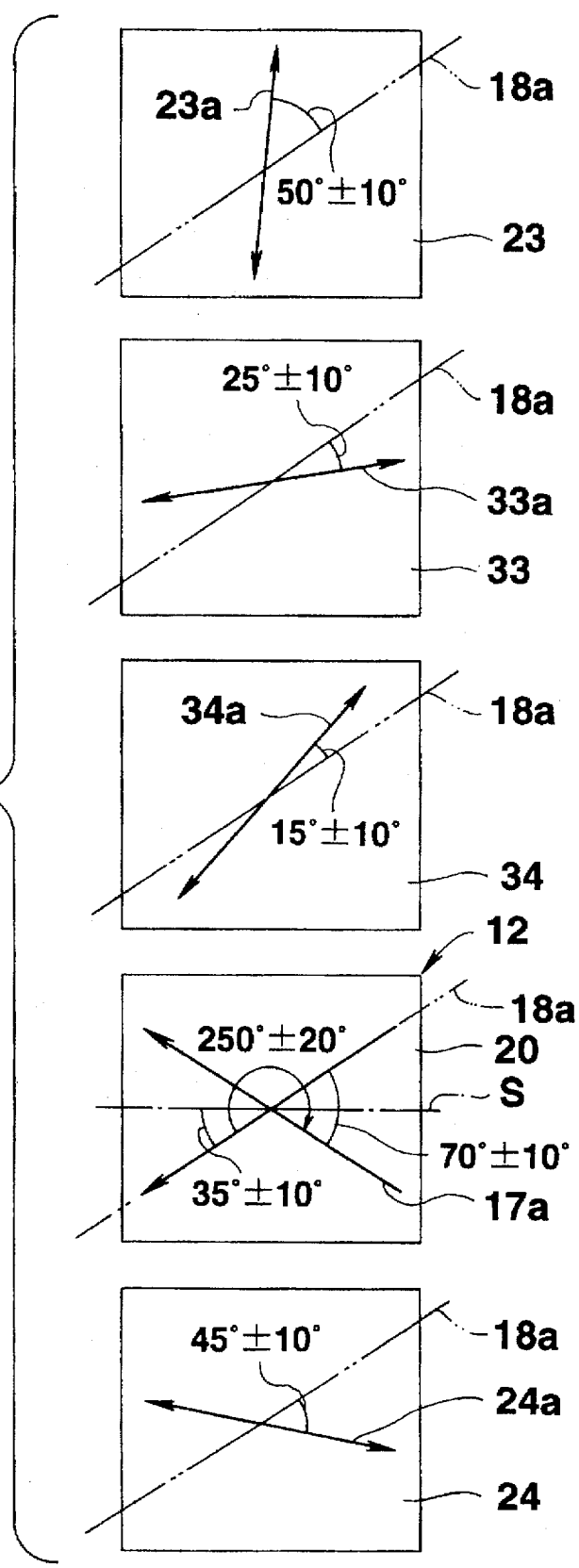
FIG. 8 is a view for explaining the positions/arrangement of the optical axes of optical elements in the third embodiment.

FIG. 7 is a sectional view showing the arrangement of a color liquid crystal display device 31 according to the third embodiment, and FIG. 8 is a plan view showing the positions of the optical axes of the color liquid crystal display device 31.

Referring to FIG. 7, a liquid crystal cell 12 is constituted such that a first substrate (to be referred to as an upper glass substrate hereinafter) 13 and a second substrate (to be referred to as a lower glass substrate hereinafter) 14 are arranged to oppose each other with a small gap, e.g., an interval of 6.8 μm, in which a liquid crystal layer is sealed. A plurality of scanning electrodes 15 consisting of a transparent conductive material such as ITO (indium-tin oxide) and a plurality of signal electrodes 16 are arranged on the opposing surfaces of both the upper and lower glass substrates 13 and 14 to cross each other.

Aligning films 17 and 18 are arranged on the inner surfaces of the upper and lower glass substrates of the liquid crystal cell 12 and on the front surfaces of the scanning electrodes 15 and the signal electrodes 16 arranged on the inner surfaces of the upper and lower glass substrates, respectively. The aligning films 17 and 18 are used to regulate a liquid crystal molecule aligning direction. The aligning films 17 and 18 are subjected to aligning treatment by a rubbing method or the like, thereby adjusting the parallel direction of adjacent liquid crystal molecules to the aligning treatment direction.

A seal member 19 is arranged in the peripheral portion between the upper and lower glass substrates 13 and 14 and keeps the predetermined interval between the upper and lower glass substrates to seal a liquid crystal in an area between the upper and lower glass substrates 13 and 14.

A liquid crystal layer 32 is compounded of a nematic liquid crystal containing a chiral liquid crystal, and the liquid crystal molecules are twisted and aligned at a twist/alignment angle of 250°±20° (preferably ±10°) in accordance with the alignment regulating forces of the aligning films 17 and 18.

An optical anisotropy Δn of the liquid crystal is set to be about 0.2, and a thickness d of the liquid crystal layer 32 is set to be about 6.8 μm. That is, a product Δn·d is set as Δn·d=1,360 nm±100 nm.

A second complex refracting element 33 on a first complex refracting element 34 arranged on the upper glass substrate 13 has a refractive index defined by a complex number. Assume that a direction (in-plane stretching direction) in which a maximum refractive index is obtained on a plane perpendicular to the direction of thickness of the second complex refracting element 33 is represented by an x direction, that a direction perpendicular to the x direction on the plane is represented by a y direction, and that the direction of thickness is represented by a z direction. In this case, complex refraction indexes $N_x$, $N_y$, and $N_z$ in the x, y, and z directions are expressed by the following numerical formulas (2) to (4):

$$N_x = n_x - ik_x \ldots \quad (2)$$

$$N_y = n_y - ik_y \ldots \quad (3)$$

$$N_z = n_z - ik_z \ldots \quad (4)$$

where $n_x$, $n_y$, and $n_z$ are refractive indexes, i is an imaginary number, and $k_x$, $k_y$, and $k_z$ are absorption coefficients.

The refractive indexes $n_x$, $n_y$, and $n_z$ satisfy $n_x > n_z > n_y$. A product Δn·t of a refractive index anisotropy $\Delta n = n_x - n_y$ and a thickness t thereof is set to be not less than 1500 nm, and preferably 1,600 nm ±30 nm, and an Rz value is set to be 0.3 to 0.7, and preferably 0.45±0.1.

The absorption coefficients $k_x$, $k_y$, and $k_z$ are functions of a wavelength λ, and can be represented by $k_x(\lambda)$, $k_y(\lambda)$, and $k_z(\lambda)$, respectively.

Figure 9:
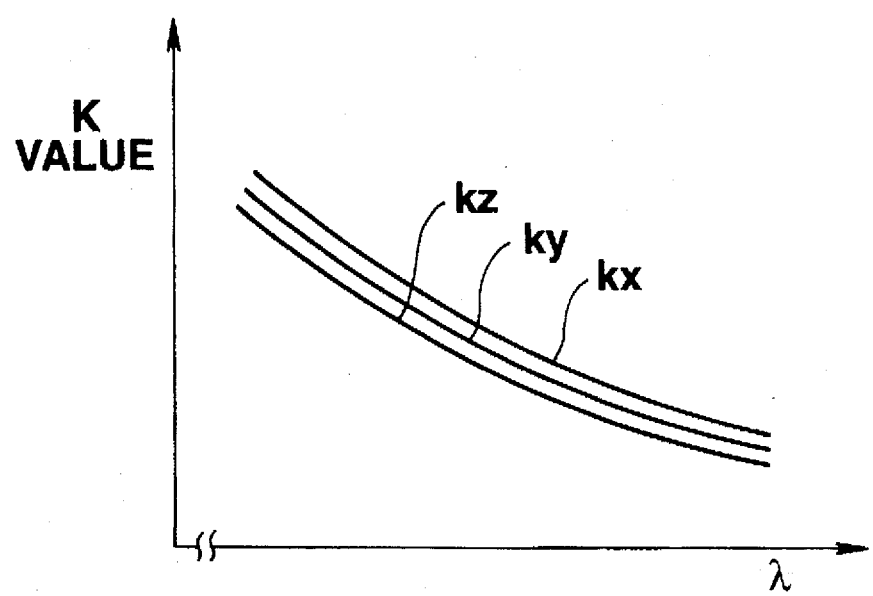
FIG. 9 is a graph showing the wavelength dependency of an absorption coefficient.

In this case, the absorption coefficients $k_x(\lambda)$, $k_y(\lambda)$, and $k_z(\lambda)$, as shown in FIG. 9, have negative inclinations such that the absorption coefficients are in inverse proportion to the wavelength λ, i.e., have negative wavelength dependencies.

The difference between a general refractive index and a complex refractive index will be described below. Assume that light is a wave. In this case, when the intensity amplitude of light incident on an optical element (e.g., a retardation plate) having a general refractive index is represented by $I_i$, an amplitude $I_o$ of the exit light is expressed by equation (5). When the intensity amplitude of light incident on a complex refracting element having a complex refractive index is represented by $I_i$, the amplitude $I_o$ of the exit light is expressed by equation (6).

$$I_o = e^{-i2\pi n t/\lambda} \ldots \quad (5)$$

$$I_o = e^{-2\pi k t/\lambda} \cdot e^{-i2\pi n t/\lambda} \ldots \quad (6)$$

where t is the thickness of the retardation plate or the complex refracting element, and $\exp(-2\pi kt/\lambda)$ in equation (6) is an absorption term.

A Jones matrix used to calculate the polarized state of light passing through the general optical element or the complex refracting element is expressed by matrix (7) with respect to the general optical element, or expressed by matrix (8) with respect to the complex refracting element.

$$\begin{bmatrix} e^{-i\pi \Delta n t/\lambda} & 0 \\ 0 & e^{i\pi \Delta n t/\lambda} \end{bmatrix} \quad (7)$$

$$e^{-\pi(k_x + k_y)t/\lambda} \begin{bmatrix} e^{-\pi \Delta k t/\lambda} \cdot e^{-i\pi \Delta n t/\lambda} & 0 \\ 0 & e^{\pi \Delta k t/\lambda} \cdot e^{-i\pi \Delta n t/\lambda} \end{bmatrix} \quad (8)$$

where Δn is a difference $(n_x - n_y)$ between $n_x$ and $n_y$, and Δk is a difference $(k_x - k_y)$ between $k_x$ and $k_y$.

In this embodiment, Δk is almost zero, i.e., $k_x$ and $k_y$ respectively have almost equal values (more precisely, almost equal functions), and $k_z$ also has a value equal to each of $k_x$ and $k_y$.

The first complex refracting element 34 also has a complex refractive index defined by a complex number, and has an absorption coefficient having a negative inclination. The first complex refracting element 34 has a value Δn·d of not less than 1500 nm, and preferably 1,550 nm±30 nm and an Rz value of 0.3 to 0.7, and preferably 0.45±0.1.

An upper polarizing plate 23 and a lower polarizing plate 24 shield (absorb) a polarized light component of incident light in an absorption axis direction, and transmit a polarized light component thereof perpendicular to the absorption axis direction.

The reflecting plate 25 is arranged on the lower surface of the lower polarizing plate 24, and reflects, to the liquid crystal cell 12 side, light incident on the upper polarizing plate 23 and transmitted through the liquid crystal cell 12 and the lower polarizing plate 24.

FIG. 8 illustrates a combination of the aligning treatment direction of the liquid crystal cell 12, the optical axes (in-plane stretching axes) of the complex refracting elements 33 and 34, and the transmission axes of the polarizing plates 23 and 24 using the plan view of the constituent elements.

As shown in FIG. 8, a transmission axis 23a of the upper polarizing plate 23 is set to cross the aligning treatment direction 18a of the lower aligning film 18 at 50°±10° (85°±10° with respect to a reference line S).

A stretching axis (axis having a maximum refractive index on a plane) 33a of the second complex refracting element 33 is set to cross the aligning treatment direction 18a of the lower aligning film 18 at 25°±10° (10°±10° with respect to the reference line S).

A stretching axis 34a of the first complex refracting element 34 is set to cross the aligning treatment direction 18a of the lower aligning film 18 at 15°±10° (50°±10° with respect to the reference line S).

A transmission axis 24a of the lower polarizing plate 24 is set to cross the aligning treatment direction 18a of the lower aligning film 18 at 45°±10° (10°±10° with respect to the reference line S).

The coloring principle of the color liquid crystal display device with the above arrangement will be described below.

Light incident from the upper direction in FIG. 7 on the upper surface side of the color liquid crystal display device 11 is changed into linearly polarized light by transmitting the light through the upper polarizing plate 23. While the linearly polarized light is transmitted through the complex refracting elements 33 and 34, the linearly polarized light receives a birefringence function corresponding to retardation values and optical positioning conditions such as the positions of the stretching axes 33a and 34a of the complex refracting elements 33 and 34, thereby obtaining elliptically polarized light components whose polarized states are different from each other at the respective wavelengths. While these elliptically polarized light components having different wavelengths are transmitted through the liquid crystal cell 12, the elliptically polarized light components receive a birefringence function corresponding to the optical positioning conditions and retardation value of the liquid crystal cell 12, thereby changing their polarized states.

When the elliptically polarized light components which respectively have different polarized states at different wavelengths and receive the birefringence functions of the complex refracting elements 33 and 34 and the liquid crystal cell 12 are incident on the lower polarizing plate 24, a polarized light component which coincides with the transmission axis 24a of the lower polarizing plate 24 is transmitted through the lower polarizing plate 24.

The light transmitted through the lower polarizing plate 24 is reflected by the reflecting plate 25 and emerges from the upper surface side of the color liquid crystal display device 11 through a path reverse to the above optical path, and the color of the exit light is used as a display color.

The retardation of each of the complex refracting elements 33 and 34 is an almost predetermined value determined depending on the product Δn·t of the refractive index anisotropy Δn and thickness t of a corresponding one of the complex refracting elements 33 and 34, and the retardation of the liquid crystal cell 12 is determined depending on the aligned state of the liquid crystal molecules. Therefore, when the aligned state of the liquid crystal molecules is changed by changing the value of a voltage applied across the opposing electrodes 15 and 16 to change polarizing function of the liquid crystal cell 12, thereby changing the hue and luminance of a display color.

Figure 10A:
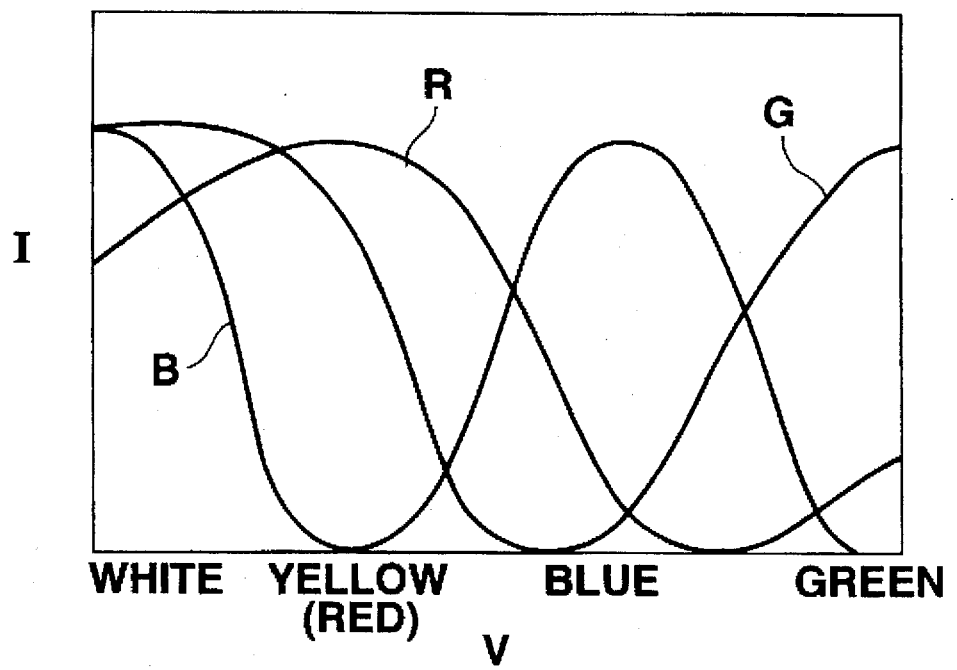
FIG. 10A is a graph showing the relationship between applied voltages and the intensities of red, green, and blue exit light components when an absorption coefficient is set to be a predetermined value independently of a wavelength.

Assume that the imaginary number terms of the complex refracting elements 33 and 34, i.e., the absorption coefficients $k_x$, $k_y$, and $k_z$, respectively have predetermined values independently of a wavelength. In this case, the emerging intensities of red light (610 nm), green light (550 nm), and blue light (450 nm) corresponding to a voltage V applied across the electrodes 15 and 16 change as shown in FIG. 10A. More specifically, the red light having a long wavelength has an intensity which changes in a long cycle when the voltage V changes. The green or blue light having a short wavelength has an intensity which changes in a short cycle when the voltage V changes. For this reason, even in a voltage range in which the red light has a predetermined intensity or more, the green or blue light has a high intensity to some extent. That is, according to the characteristics shown in FIG. 10A, an area in which the green or blue light has a relatively high intensity is located in an area in which the red exit light has a high intensity. For this reason, the red light and the green or blue light emerge, and red light having a high color purity cannot be easily extracted.

Since a voltage area in which the intensity of the red exit light is relatively low is large, in this voltage area, the green or blue exit light can be extracted without color mixing.

Figure 10B:
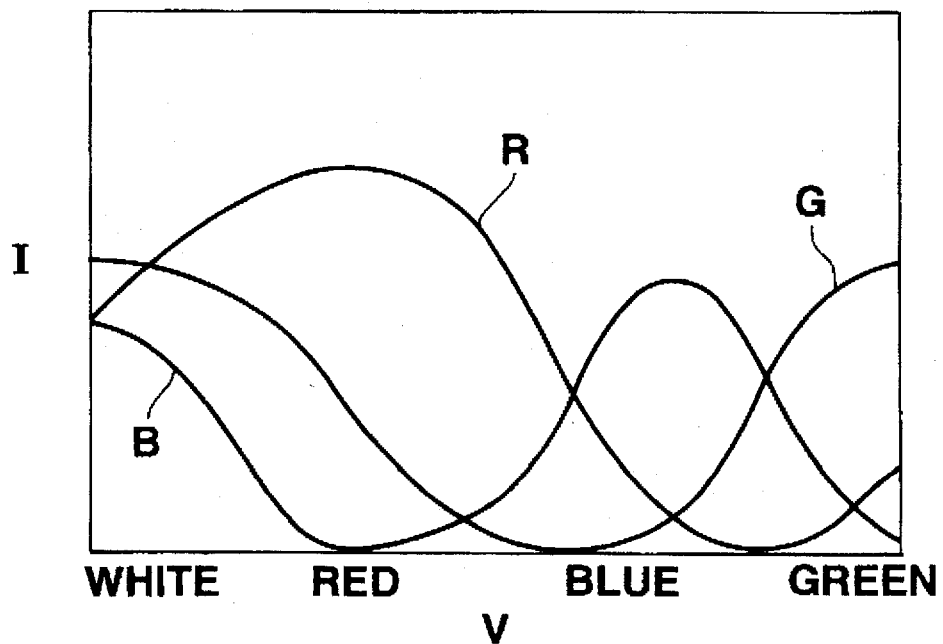
FIG. 10B is a graph showing the relationship between applied voltages and red, green, blue exit light components in the third embodiment.

When an absorption coefficient $k(\lambda)$ has a negative wavelength dependency (the absorption coefficient is inverse proportion to a wavelength) as shown in FIG. 9, the absorption ratio of light decreases as the wavelength of the light increases. For this reason, as shown in FIG. 10B, the intensity of the green or blue light is relatively lower than that of the red light. If the red light and the green or blue light emerge at a time, and color mixing occurs, the influence of color mixing is small because the intensity of the green or blue light is low. Therefore, red having a high color purity can be displayed.

Green or blue display can be selected in a voltage area which is relatively large and in which the intensity of the red exit light is low, and the green light and the blue light change in relatively short cycles. For this reason, the green light and the blue light can be easily separated from each other, and green and blue each having a high color purity can be displayed.

As described above, according to the above embodiment, when an electric field (effective voltage) applied to the liquid crystal layer 32 is controlled by controlling a voltage applied across the scanning electrodes 15 and the signal electrodes 16 to control the birefringence characteristics of the liquid crystal layer 32, desired colors, especially, three primary colors each having a high color purity can be displayed.

According to the above arrangement, the complex refracting elements 33 and 34 each having a phase difference in the direction of thickness are used. For this reason, the difference between a phase obtained when light is vertically transmitted through the liquid crystal layer 32 and a phase obtained when the light is obliquely transmitted through the liquid crystal layer 32 is compensated for by transmitting the light through the complex refracting elements 33 and 34, thereby increasing a field angle.

A display color is obtained by not only the birefringence function of the liquid crystal layer 32 but also the birefringence functions of the complex refracting elements 33 and 34. The two complex refracting elements 33 and 34 each having a birefringence function whose temperature dependency is smaller than that of the birefringence function of the liquid crystal layer 32 are used. For this reason, even when the retardation of the liquid crystal layer 32 is changed by a change in temperature, the change in retardation has a relatively small influence on the display color. Therefore, a variation in display color caused by a change in temperature can be reduced.

With an increase in voltage (effective voltage) applied to the liquid crystal layer 32, the display color is sequentially changed to white, red, blue, and green in an order named. Three primary colors and white can be displayed, so that a practical color image can be satisfactorily obtained.

EXAMPLE

As an example of the third embodiment, a color liquid crystal display device was formed under the following conditions. That is, the angles of the aligning treatment directions 17a and 18a of the aligning films 17 and 18, the stretching axes 33a and 34a of the complex refracting elements 33 and 34, and the transmission axes 23a and 24a of the polarizing plates 23 and 24 were respectively set to be the central angles shown in FIG. 8, the thickness d of the liquid crystal layer 32 was set to be 6.8 μm, and the value Δn·d was set to be 1,390 nm. The absorption coefficient of the complex refracting elements 33 and 34 with respect to a wavelength of 610 nm is set to be 0.05, the absorption coefficient with respect to a wavelength of 550 nm is set to be 0.09, and the absorption coefficient with respect to a wavelength of 450 nm is set to be 0.12. Signals supplied to the scanning electrodes 15 and the signal electrodes 16 were controlled to statically drive the color liquid crystal display device.

Figures 11, 12:
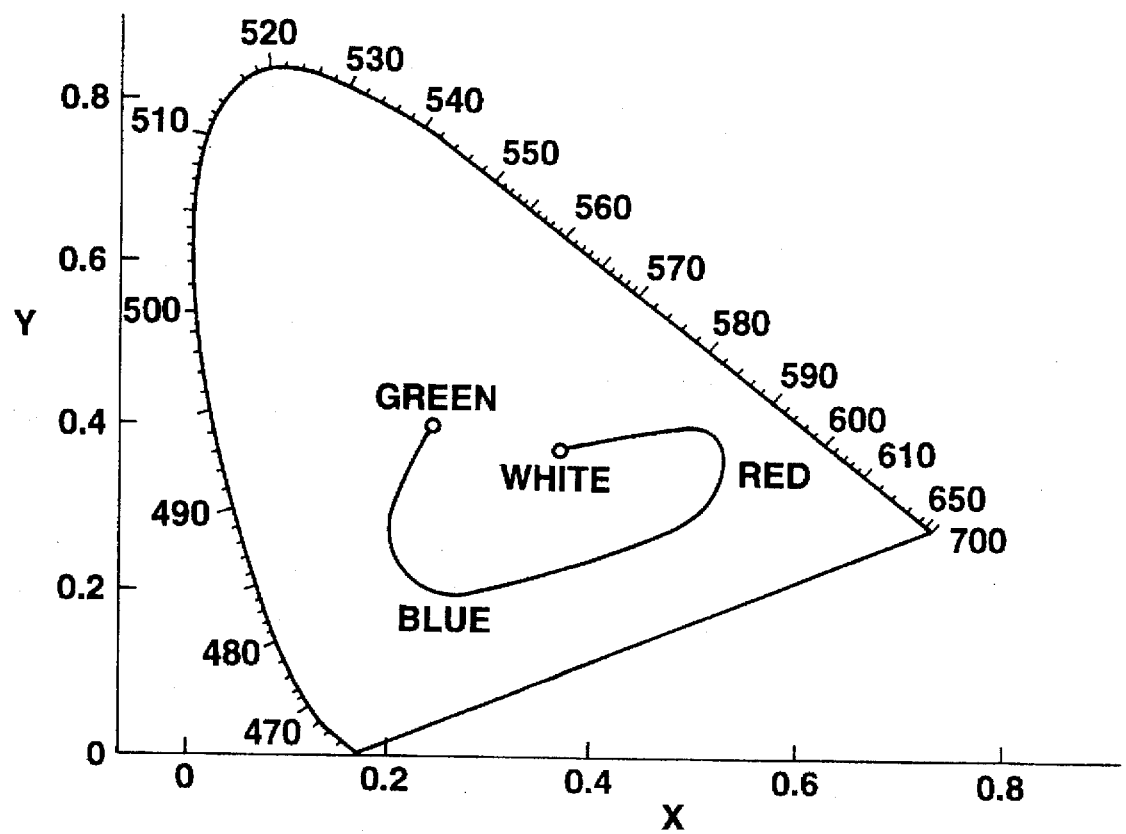
FIG. 11 is a table showing the relationship between applied voltages and display colors in the color liquid crystal display device of the third embodiment.
FIG. 12 is a CIE diagram showing a change in display color in the third embodiment.

In this case, as shown in FIG. 11, the display color of the color liquid crystal display device became white when the effective value of a static voltage, e.g., an applied voltage was less than 2.04 V, the display color became red when the effective value fell within the range of 2.12 v to 2.18 v, the display color became blue when the effective value fell within the range of 2.19 v to 2.21 V, and the display color became green when the effective value was 2.27 V or more. Each display color had a high color purity, as shown in the CIE diagram of FIG. 12.

COMPARATIVE EXAMPLE

As a comparative example, a color liquid crystal display device having an arrangement which was substantially the same as that of the example except that two complex refracting elements 33 and 34 each having an absorption coefficient which was 0.10 at the wavelengths of 610 nm, 550 nm, and 450 nm were arranged was formed. Signals supplied to the scanning electrodes 15 and the signal electrodes 16 were controlled to statically control the color liquid crystal display device.

In this case, the display color of the color liquid crystal display device became white when the effective value of a static voltage, e.g., an applied voltage was less than 2.04 V, the display color became yellow (reddish yellow) when the effective value fell within the range of 2.15 V to 2.17 V, the display color became blue when the effective value fell within the range of 2.18 V to 2.22 V, and the display color became green when the effective value was 2.26 v or more. The color purity of red was low.

As is apparent from the example and comparative example, according to the present invention, three primary colors each having a high color purity, and especially, red having a high color purity, can be displayed.

In the color liquid crystal display device according to this example, a variation in display color caused by a change in temperature was small, and an angle of visibility was increased.

[Fourth Embodiment]

The fourth embodiment is obtained such that the two complex refracting elements and their positions in the third embodiment are changed.

Figure 13:
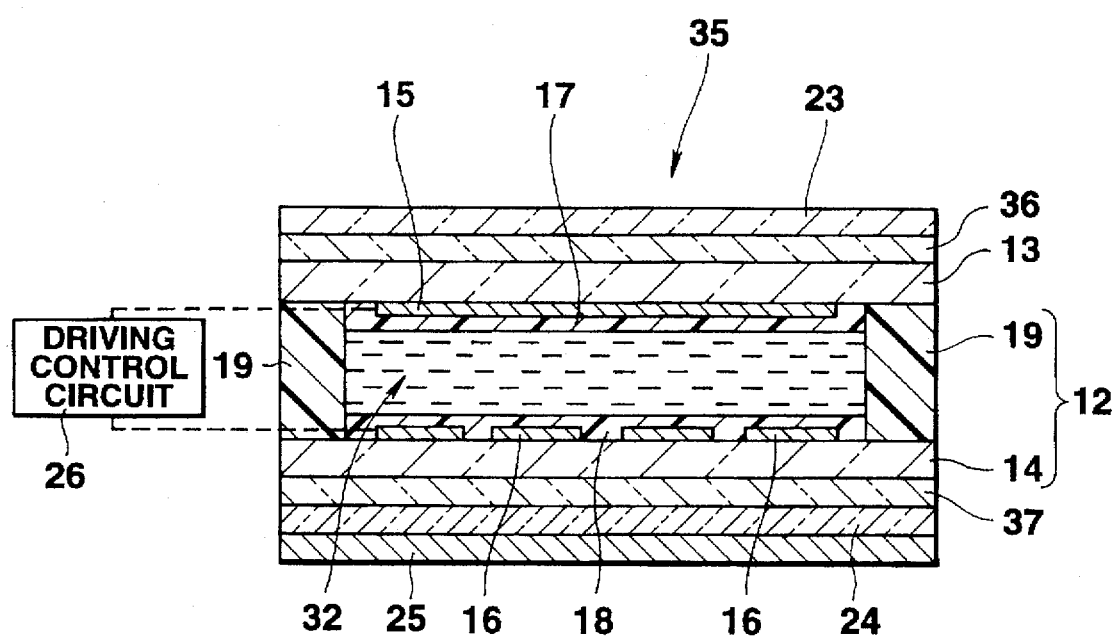
FIG. 13 is a sectional view showing a color liquid crystal display device as the fourth embodiment of the present invention.

In the third embodiment, the two complex refracting elements 33 and 34 are arranged between the upper glass substrate 13 and the upper polarizing plate 23. However, the positions of the complex refracting elements may be arbitrarily determined. More specifically, as shown in FIG. 13, a complex refracting element 36 may be arranged between an upper glass substrate 13 and an upper polarizing plate 23, and a complex refracting element 37 may be arranged between a lower glass substrate 14 and a lower polarizing plate 24.

Figure 14:
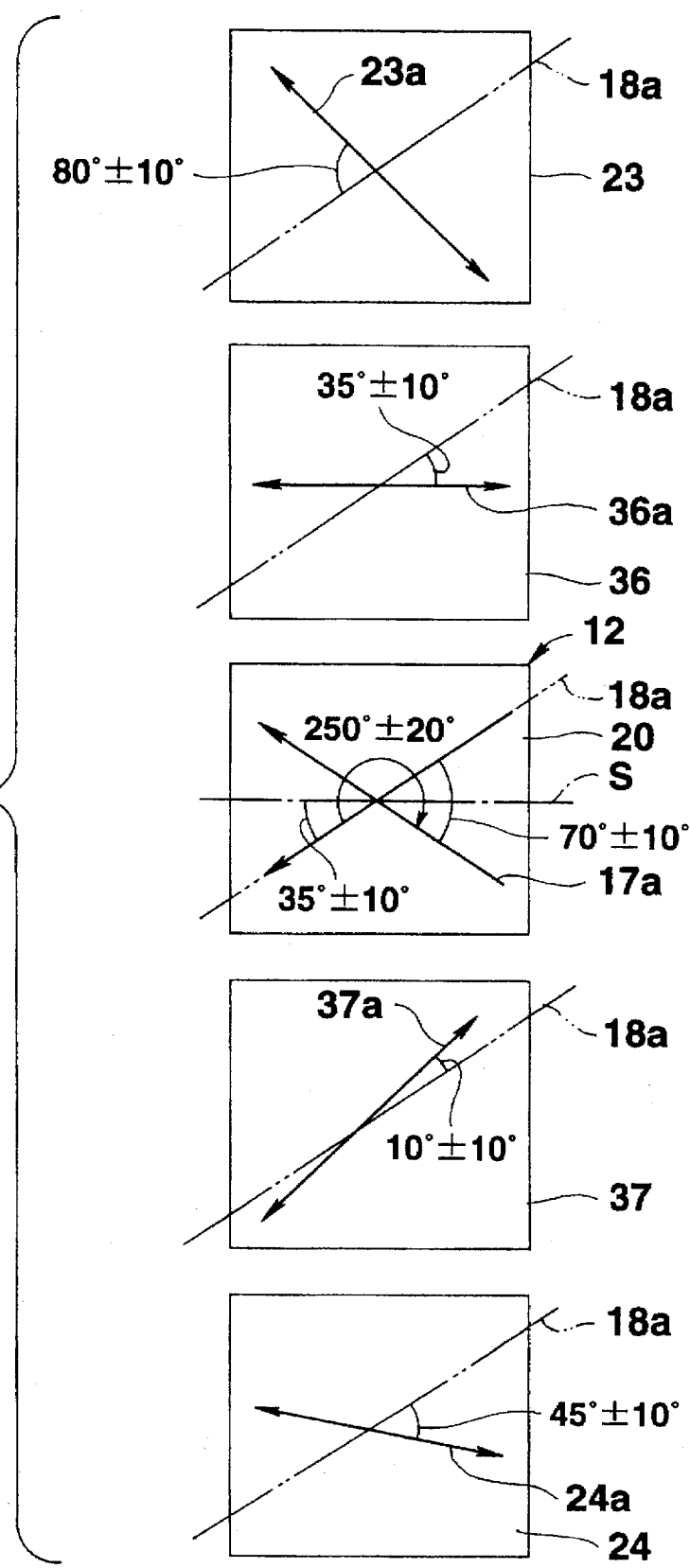
FIG. 14 is a view for explaining the positions/arrangement of the optical axes of optical elements in the fourth embodiment.

When the complex refracting elements 36 and 37 are arranged as described above, aligning treatment directions 17a and 18a of aligning films 17 and 18, stretching axes 36a and 37a of the complex refracting elements 36 and 37, and transmission axes 23a and 24a of the polarizing plates 23 and 24 are arranged as shown in FIG. 14.

As shown in FIG. 14, the transmission axis 23a of the upper polarizing plate 23 is set to cross an aligning treatment direction 18a of the lower aligning film 18 at 80°±10° (45°±10° with respect to a reference line S).

A stretching axis (axis having a maximum refractive index on a plane) 36a of one complex refracting element 36 is set to cross the aligning treatment direction 18a of the lower aligning film 18 at 35°±10° (0°±10° with respect to the reference line S).

A stretching axis 37a of the other complex refracting element 37 is set to cross the aligning treatment direction 18a of the lower aligning film 18 at 10°±10° (45°±10° with respect to the reference line S).

A transmission axis 24a of the lower polarizing plate 24 is set to cross the aligning treatment direction 18a of the lower aligning film 18 at 45°±10° (10°±10° with respect to the reference line S).

The complex refracting element 36 has a value Δn·t of not less than 1500 nm, and preferably 1,600 nm±30 nm and an Rz value of 0.3 to 0.7 (preferably 0.45±0.1). A liquid crystal layer 32 has a value Δn·d of 1,350 nm ±100 nm. The complex refracting element 37 has a value Δn·t of not less than 1500 nm, and preferably 1,600 nm ±30 nm and an Rz value of 0.3 to 0.7 (preferably 0.45 ±0.1).

With the above arrangement, when the effective voltage applied to the liquid crystal layer 32 is controlled to control a display color, a color image can be displayed. In particular, three primary colors each having a high color purity can be displayed. In addition, the complex refracting elements 36 and 37 each having a phase difference in the direction of thickness are used. For this reason, the difference between a phase obtained when light is vertically transmitted through the liquid crystal layer 32 and a phase obtained when the light is obliquely transmitted through the liquid crystal layer 32 is compensated for by transmitting the light through the complex refracting elements 36 and 37, thereby increasing a field angle.

As described above, according to the color liquid crystal display device of the present invention, three primary colors each having a high color purity can be displayed. In addition, an angle of visibility is increased, and color misregistration or the like caused by a change in temperature can be reduced.

Each of the third and fourth embodiments describes an example wherein the two complex refracting elements are arranged between both the polarizing plates 23 and 24. However, the present invention is not limited to the third and fourth embodiments, and one or three or more complex refracting elements may be arranged between the upper polarizing plates 23 and 24.

In each of the third and fourth embodiments, a complex refracting element having different refractive indexes in three directions perpendicular to each other is used. However, the complex refracting element is not limited to the complex refracting element used in each of the third and fourth embodiments.

The description is made assuming that the absorption coefficients $k_x$, $k_y$, and $k_z$ of the imaginary number terms of complex refractive indexes are almost equal to each other. However, these coefficients may be different from each other. In addition, FIG. 9 shows an example wherein the absorption coefficients $k_x$, $k_y$, and $k_z$ of the imaginary numbers of the complex refractive indexes uniformly decrease as the wavelength $\lambda$ increases. However, if an absorption coefficient in a red wavelength range is smaller than that in a green or blue wavelength range, the state and degree of a change are arbitrarily set.

[Fifth Embodiment]

According to the fifth embodiment, a twist-aligned retardation plate formed by twist-aligning material molecules from one surface to the other surface is arranged as a color adjusting optical element, and the twist/alignment angle of the material molecules of the twist-aligned retardation plate is set to have the same value as, but a direction reverse to the twist/alignment angle of the liquid crystal molecules of a liquid crystal layer.

Figure 15:
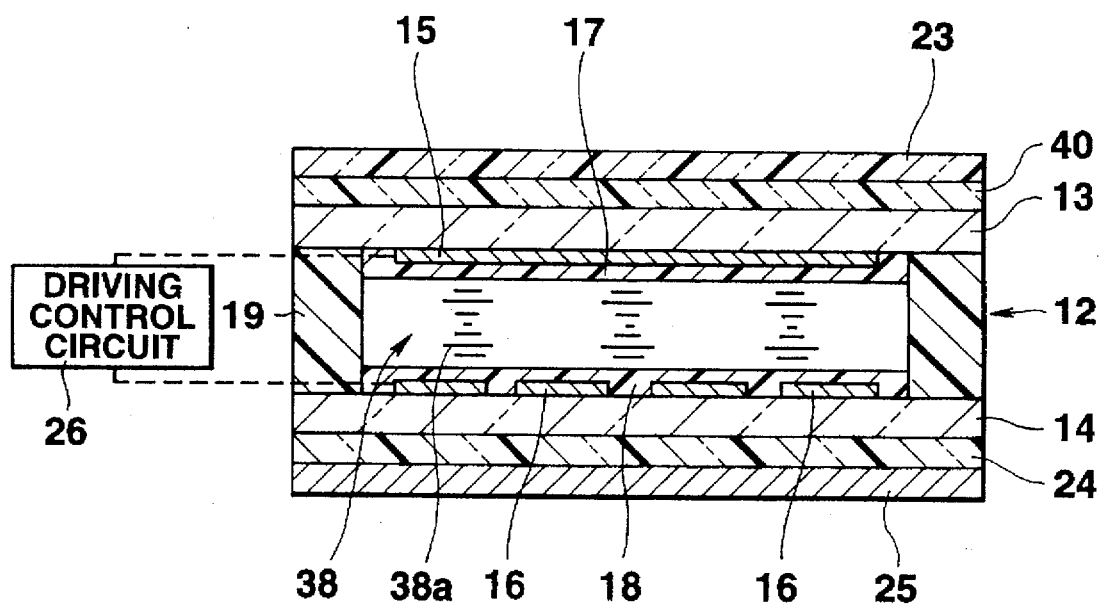
FIG. 15 is a sectional view showing a color liquid crystal display device as the fifth embodiment of the present invention.

In a color liquid crystal display device according to the fifth embodiment, as shown in FIG. 15, a liquid crystal cell 12 in which liquid crystal molecules 38a are twist-aligned at a twist/alignment angle of 180° to 270° is used, and a retardation plate 40 whose material molecules are twist-aligned at 180° to 270° is used. The color liquid crystal display device comprises the liquid crystal cell 12, the twist-aligned retardation plate 40, and a pair of polarizing plates 23 and 24. The pair of polarizing plates 23 and 24 are arranged on the front and rear surface sides of the liquid crystal cell 12, and the twist-aligned retardation plate 40 is arranged between the liquid crystal cell 12 and the upper polarizing plate 23 on the front surface side (upper side in FIG. 15).

In the color liquid crystal device of the fifth embodiment, a transmission axis 23a of the upper polarizing plate 23, of the pair of polarizing plates 23 and 24, arranged on the incident side, i.e., the front surface side, is obliquely shifted by a predetermined angle with respect to a molecule aligning direction 40a on the front surface side of the twist-aligned retardation plate 40, of the twist-aligned retardation plate 40 and the liquid crystal cell 12, arranged on the front surface side. A transmission axis 24a of the lower polarizing plate 24 on a reflecting side, i.e., the rear surface side is obliquely shifted by a predetermined angle with respect to a liquid crystal molecule aligning direction 18a on the rear surface side of the liquid crystal cell 12.

In this embodiment, the twist-aligned retardation plate 40 is constituted by a film obtained by twist-aligning a polymer liquid crystal and solidifying the polymer liquid crystal. In the twist-aligned retardation plate 40, a value $\Delta n_1 d_1$ and the twist/alignment angle of a material molecule are set to be almost equal to a value $\Delta n_2 d_2$ of the liquid crystal cell 12 and the twist/alignment angle of liquid crystal molecules, respectively. The twist-aligning direction of the molecules of the twist-aligned retardation plate 40 is set to be reverse to the twisting direction of the liquid crystal molecules of the liquid crystal cell 12, and the transmission axes of the pair of polarizing plates 23 and 24 are set to be almost parallel to each other. Note that, in this embodiment, the twist/alignment angle of the liquid crystal molecules of the liquid crystal cell 12 and the twist/alignment angle of the molecule of the twist-aligned retardation plate 40 are set to be about 250°.

Figure 16:
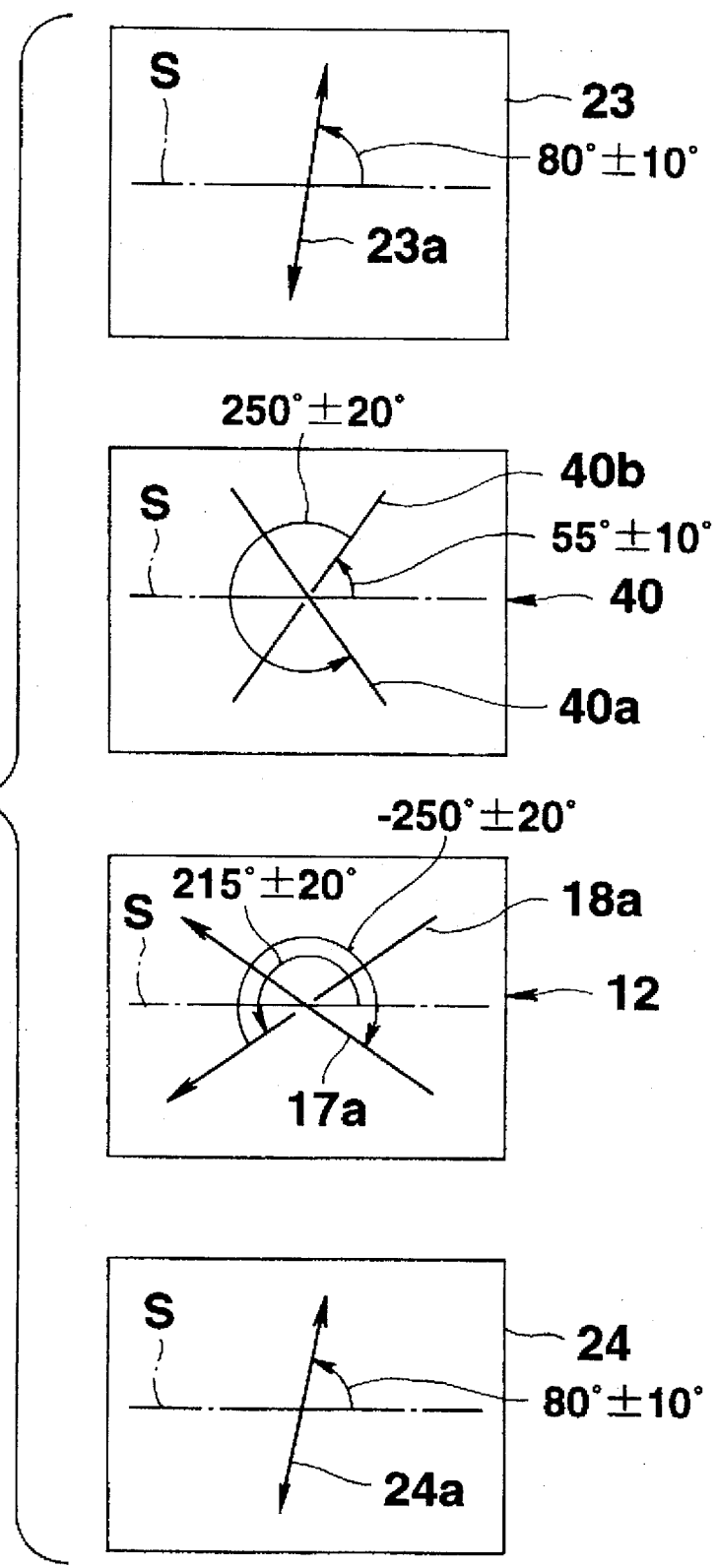
FIG. 16 is a view for explaining the positions/arrangement of the optical axes of optical elements in the fifth embodiment.

More specifically, as shown in FIG. 16, the liquid crystal molecule aligning direction 18a on the rear surface side of the liquid crystal cell 12 has a direction shifted by about 215° (215° counterclockwise in FIG. 16) with respect to a reference line S, and a liquid crystal molecule aligning direction 17a on the front surface side has a direction shifted by about 250° with respect to the aligning direction 18a on the rear surface side, and the molecules 38a of a liquid crystal 38 are twist-aligned at a twist/alignment angle of about −250° (250° clockwise in FIG. 16) from a rear substrate 14 to a front substrate 13.

A molecule aligning direction 40b on the rear surface side of the twist-aligned retardation plate 40 has a direction shifted by about 55° (55° counterclockwise in FIG. 16) with respect to the reference line S, and the molecule aligning direction 40a on the front surface side has a direction shifted by about 250° with respect to the molecule aligning direction 40b on the rear surface side. Therefore, the material molecules, i.e., polymer liquid crystal molecules, of the twist-aligned retardation plate 40 are twist-aligned at a twist/alignment angle of 250° (250° counterclockwise in FIG. 16) from the rear surface of the twist-aligned retardation plate 40 to the front surface thereof.

More specifically, the material molecules of the twist-aligned retardation plate 40 are twist-aligned in a direction reverse to the liquid crystal molecule twist-aligning direction of the liquid crystal cell 12 at a twist/alignment angle almost equal to the twist/alignment angle of the liquid crystal molecules.

As shown in FIG. 16, the transmission axis 23a of the upper polarizing plate 23 and the transmission axis 24a of the lower polarizing plate 24 are shifted by 80° (80° counterclockwise in FIG. 16) with respect to the reference line S. The transmission axis 23a of the upper polarizing plate 23 is shifted by 45° with respect to the molecule aligning direction 40a on the incident side (front surface side) of the twist-aligned retardation plate 40 adjacent to the upper polarizing plate 23. The transmission axis 24a of the lower polarizing plate 24 is almost parallel to the transmission axis 23a of the upper polarizing plate 23.

In the color liquid crystal display device of this embodiment, the molecule aligning direction 40a on the incident side (front surface side) of the twist-aligned retardation plate 40, of the twist-aligned retardation plate 40 and the liquid crystal cell 12, arranged on the incident side is obliquely shifted from the transmission axis 23a of the polarizing plate 23 on the incident side, i.e., the front surface side. For this reason, linearly polarized light incident through the upper polarizing plate 23 is polarized by the birefringence function of the twist-aligned retardation plate 40 to obtain elliptically polarized light. The elliptically polarized light is polarized by the birefringence function of the liquid crystal layer of the liquid crystal cell 12 and then incident on the lower polarizing plate 24.

The birefringence function of the twist-aligned retardation plate 40 is determined by the characteristics of the twist-aligned retardation plate 40. However, since the birefringence function of the liquid crystal layer of the liquid crystal cell 12 changes depending on the aligned state of the liquid crystal molecules 38a, the polarized state of the elliptically polarized light incident on the lower polarizing plate 24 changes depending on a voltage applied to the liquid crystal cell 12.

When light incident on the lower polarizing plate 24 is elliptically polarized light, only a polarized light component of the light which is transmitted through the lower polarizing plate 24 emerges through the lower polarizing plate 24. This exit light becomes colored light corresponding to the wavelength band of the exit light. The colored light is reflected by the reflecting plate 25, and emerges from the front surface side of the display device through the lower polarizing plate 24, the liquid crystal cell 12, the twist-aligned retardation plate 40, and the upper polarizing plate 23.

In the color liquid crystal display device, as described above, the value $\Delta n_1 d_1$ of the twist-aligned retardation plate 40 and the twist/alignment angle of the molecule aligning direction are set to be almost equal to the $\Delta n_2 d_2$ of the liquid crystal cell 12 and the twist/alignment angle of the liquid crystal molecules, respectively, the twist-aligning direction of the material molecules of the twist-aligned retardation plate 40 is set to be reverse to the twist-aligning direction of the liquid crystal molecules, and the transmission axes 23a and 24a of the pair of upper and lower polarizing plates 23 and 24 are set to be almost parallel to each other. For this reason, the liquid crystal cell 12 has an achromatic function when the liquid crystal molecules 38a are set in an initial aligned state. Therefore, when no ON voltage is applied across the electrodes 15 and 16 of the liquid crystal cell 12, light incident on the lower polarizing plate 24 becomes linearly polarized light which is the same as linearly polarized light obtained when light is incident on a liquid crystal display device, thereby obtaining achromatic light (white light) as exit light.

In the color liquid crystal display device, the color of colored light can be changed by controlling a voltage applied to the liquid crystal cell 12. Therefore, a plurality of colors can be displayed.

An example of the display colors of the color liquid crystal display device will be described below. For example, the $\Delta n_1 d_1$ of the twist-aligned retardation plate 40 and the value $\Delta n_2 d_2$ of the liquid crystal cell 12 are set to be 843 nm, and the liquid crystal molecule aligning directions 17a and 18a of the liquid crystal cell 12, the molecule aligning directions 40a and 40b on the front and rear surfaces of the twist-aligned retardation plate 40, the transmission axes 23a and 24a of the pair of upper and lower polarizing plates 23 and 24 are set as shown in FIG. 16. At this time, colored light with respect to an applied voltage (effective voltage) is as follows.

The initial display color is "white" when the voltage is 1.9 V or less.

The display color is "yellow" when a voltage of 2.0 to 2.2 V is applied.

The display color is "purple" when a voltage of 2.3 to 2.4 is applied.

The display color (final display color) is "red" when a voltage of 2.6 to 3.0 is applied.

Therefore, when the voltage applied to the liquid crystal cell 12 is controlled to obtain these colors, in addition to "white" in the absence of a voltage and "red" serving as the final display color, "yellow" and "purple" can be displayed.

In the color liquid crystal display device, light is colored by the birefringence function of the twist-aligned retardation plate 40, the birefringence function of the liquid crystal layer of the liquid crystal cell 12, and the polarizing plates 23 and 24 without using a color filter. For this reason, the transmittance of the color liquid crystal display device can be increased, and a bright color image can be displayed.

In the color liquid crystal display device, the liquid crystal cell 12 has the liquid crystal molecules 38a twist-aligned at a large twist/alignment angle of about 250°, and the twist-aligning angle of the material molecules of the twist-aligned retardation plate 40 is large, i.e., about 250°. For this reason, the birefringence functions of the liquid crystal layer of the liquid crystal cell 12 and the twist-aligned retardation plate 40 are enhanced, and, therefore, a good coloring effect can be obtained.

In the color liquid crystal display device, the shift angle between the molecule aligning direction 40a of the twist-aligned retardation plate 40 on the incident side and the transmission axis 23a of the upper polarizing plate 23 on the incident side, i.e., the front surface side is set to be about 45°. For this reason, the birefringence function of the twist-aligned retardation plate 40 is enhanced with respect to linearly polarized light, and, therefore, clear colored light can be obtained.

In the fifth embodiment, the liquid crystal cell 12 and the twist-aligned retardation plate 40 are arranged such that the twist-aligned retardation plate 40 is positioned on the incident side (front surface side). However, the liquid crystal cell 12 and the twist-aligned retardation plate 40 may be arranged such that the liquid crystal cell 12 is positioned on the incident side. In this case, when the liquid crystal molecule aligning direction 17a on the incident side, i.e., the front surface side, of the liquid crystal cell 12 is obliquely shifted from the transmission axis of the upper polarizing plate 23, linearly polarized light incident through the upper polarizing plate 23 is changed into elliptically polarized light by the birefringence function of the liquid crystal layer of the liquid crystal cell 12. The elliptically polarized light receives the birefringence function of the twist-aligned retardation plate 40 and then is incident on the lower polarizing plate 24.

As described above, when the liquid crystal cell 12 is arranged to be positioned on the incident side, the molecule aligning direction on the incident side of the twist-aligned retardation plate 40 is preferably obliquely shifted with respect to the transmission axis of the upper polarizing plate 23. In this manner, when the liquid crystal molecules 38a of the liquid crystal cell 12 are vertically aligned, i.e., when incident light is transmitted through the liquid crystal cell 12 without receiving the birefringence function of the liquid crystal layer, the light (linearly polarized light) is elliptically polarized by the birefringence function of the twist-aligned retardation plate 40, and the elliptically polarized light can be incident on the lower polarizing plate 24.

The transmission axes 23a and 24a of the pair of upper and lower polarizing plates 23 and 24 may be perpendicular to each other. In this case, when the liquid crystal molecules 38a of the liquid crystal cell 12 are set in an initial aligned state, "black" is displayed.

In addition, in the fifth embodiment, when achromatic display need not be obtained, the $\Delta n_2 d_2$ of the liquid crystal cell 12, the twist/alignment angle of the liquid crystal molecules, the twist-aligning direction of the liquid crystal molecules, and the twist-aligning directions of the transmission axes 23a and 24a of the pair of upper and lower polarizing plates 23 and 24 may be arbitrarily set.

In this embodiment, the molecule aligning direction on the incident side (front surface side) of a member, of the two members constituted by the liquid crystal cell 12 and the twist-aligned retardation plate 40 is arranged to be positioned on the incident side is shifted by about 45° with respect to the transmission axis 23a of the upper polarizing plate 23 on the incident side, i.e., the front surface side. However, this shift angle may be arbitrarily set.

In the color liquid crystal display device, linearly polarized light incident through the upper polarizing plate 23 is changed into elliptically polarized light by the birefringence function of one (arranged on the incident side) of the two members constituted by the twist-aligned retardation plate 40 and the liquid crystal cell 12. However, the birefringence function of the member with respect to linearly polarized light is maximum when the linearly polarized light is incident at a shift angle of about 45° with respect to the molecule aligning direction on the incident side of the member. For this reason, in order to obtain vivid colored light, of the molecule aligning direction 40a of the twist-aligned retardation plate 40 and the liquid crystal molecule aligning direction 17a on the incident side of the liquid crystal cell 12, the direction arranged on the incident side and the transmission axis 23a of the upper polarizing plate 23 on the incident side, i.e., the front surface side preferably have a shift angle of about 45°. When this shift angle falls within the range of 45°±5°, vivid colored light can be satisfactorily obtained.

[Sixth Embodiment]

According to the sixth embodiment, a twist-aligned retardation plate serving as a color adjusting optical element is stacked on a liquid crystal cell, the twist/alignment angle of the twist-aligned retardation plate has the twist/alignment angle of the liquid crystal molecules, and the sum of the twist/alignment angle of the twist-aligned retardation plate and the twist alignment angle of the liquid crystal molecules is set to be 230° to 270°.

Figure 17:
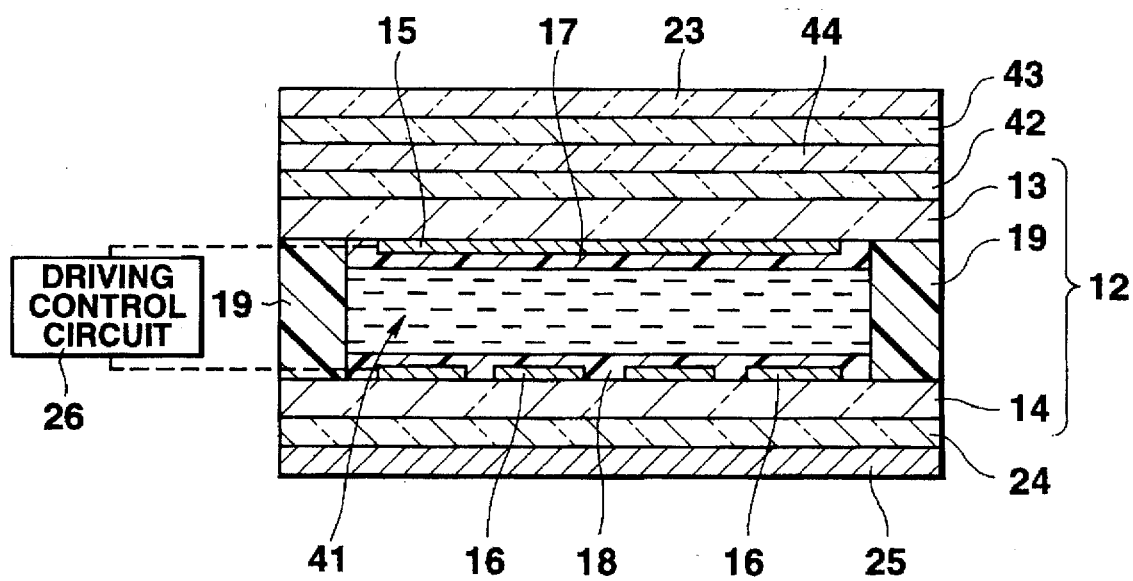
FIG. 17 is a sectional view showing a color liquid crystal display device as the sixth embodiment of the present invention.

Referring to FIG. 17, a liquid crystal layer 41 is compounded of a nematic liquid crystal containing a chiral liquid crystal, and the liquid crystal molecules are twist-aligned at a twist/alignment angle of (250°−φ) ±20° (preferably ±10°) in accordance with the alignment regulating forces of aligning films 17 and 18. In this case, φ° is the twist/alignment angle of the molecules of a twist-aligned retardation plate 42 (to be described later).

A refractive index anisotropy Δn is set to be about 0.2, and a thickness d of the liquid crystal layer 41 is set to be 6800·(250−φ)/250 nm.

The twist-aligned retardation plate 42 is constituted such that a layer (film) obtained by twist-aligning polymer liquid crystal molecules by a predetermined angle of φ° from one surface to the other surface and fixing the polymer liquid crystal molecules in this state is sandwiched between protective films consisting of cellulose triacetate (TAC) or the like. A twist-aligning direction is the same as that of the liquid crystal layer 41. The sum of the twist/alignment angle of (250°−φ°)±20° of the liquid crystal molecules and the twist/alignment angle of φ° of the liquid crystal molecules of the twist-aligned retardation plate 42 is set to be a twist/alignment angle of (250°±20°) which is required in this liquid crystal display device.

The twist/alignment angle of φ° of the twist-aligned retardation plate 42 is set to be about 10 to 30% of the total twist/alignment angles of (250°±20°), i.e., about 50°±25°. A refractive index anisotropy Δn of the twist-aligned retardation plate 42 is set to be about 0.2, and a thickness d of the twist-aligned retardation plate 42 is set to be about 6800·φ/250 nm.

The sum of the twist/alignment angle of (250°−φ°) ±20° of the liquid crystal molecules of the liquid crystal layer 41 and the twist/alignment angle of φ° of the material molecules of the twist-aligned retardation plate 42 is 250°±20° which is supposed to be required in the color liquid crystal display device. The sum of the retardation of the liquid crystal layer 41 and the retardation of the twist-aligned retardation plate 42 is 1,360 nm±100 nm which is supposed to be required in the color liquid crystal display device.

More specifically, the color liquid crystal display device has the following arrangement. That is, a liquid crystal layer which is optimally designed to have an optical anisotropy Δn of 0.2 and a thickness d of 6,800 nm is replaced with a structure constituted by stacking the liquid crystal-layer 41 having a twist/alignment angle of (250°−φ°) ±20°, an optical anisotropy Δn of 0.2, and a thickness of 6800·(250−φ)/250 nm on the twist-aligned retardation plate 42 having a twist/alignment angle of φ°, an optical anisotropy Δn of 0.2, and a thickness of 6800·φ/250 nm.

A first retardation plate 43 is a biaxial retardation plate in which, when a refraction index in a direction (in-plane stretching direction) in which a maximum refractive index is obtained on a plane perpendicular to a direction of thickness, a refractive index in a direction perpendicular to the stretching axis on the plane, and a refractive index in the direction of thickness are represented by nx, ny, and nz, respectively, nx>nz>ny is satisfied. A product Δn·d of the refractive index anisotropy Δn=nx−ny and the thickness d is set to be not less than 1500 nm, and preferably 1,600 nm±30 nm, and an Rz value is set to be 0.3 to 0.7, and preferably 0.45±0.1.

A second retardation plate 44 is a biaxial retardation plate having a product Δn·d set to be not less than 1500 nm, and preferably 1,550 nn±30 nm and an Rz value set to be 0.3 to 0.7, and preferably 0.45±0.1.

An upper polarizing plate 23 and a lower polarizing plate 24 shield (absorb) a polarized light component of incident light in an absorption axis direction and transmit a polarized light component perpendicular to the absorption axis direction.

A reflecting plate 25 is arranged on the lower surface of the lower polarizing plate 24, and reflects, to a liquid crystal cell 12 side, light incident on the upper polarizing plate 23 and transmitted through the liquid crystal cell 12 and the lower polarizing plate 24.

Figure 18:
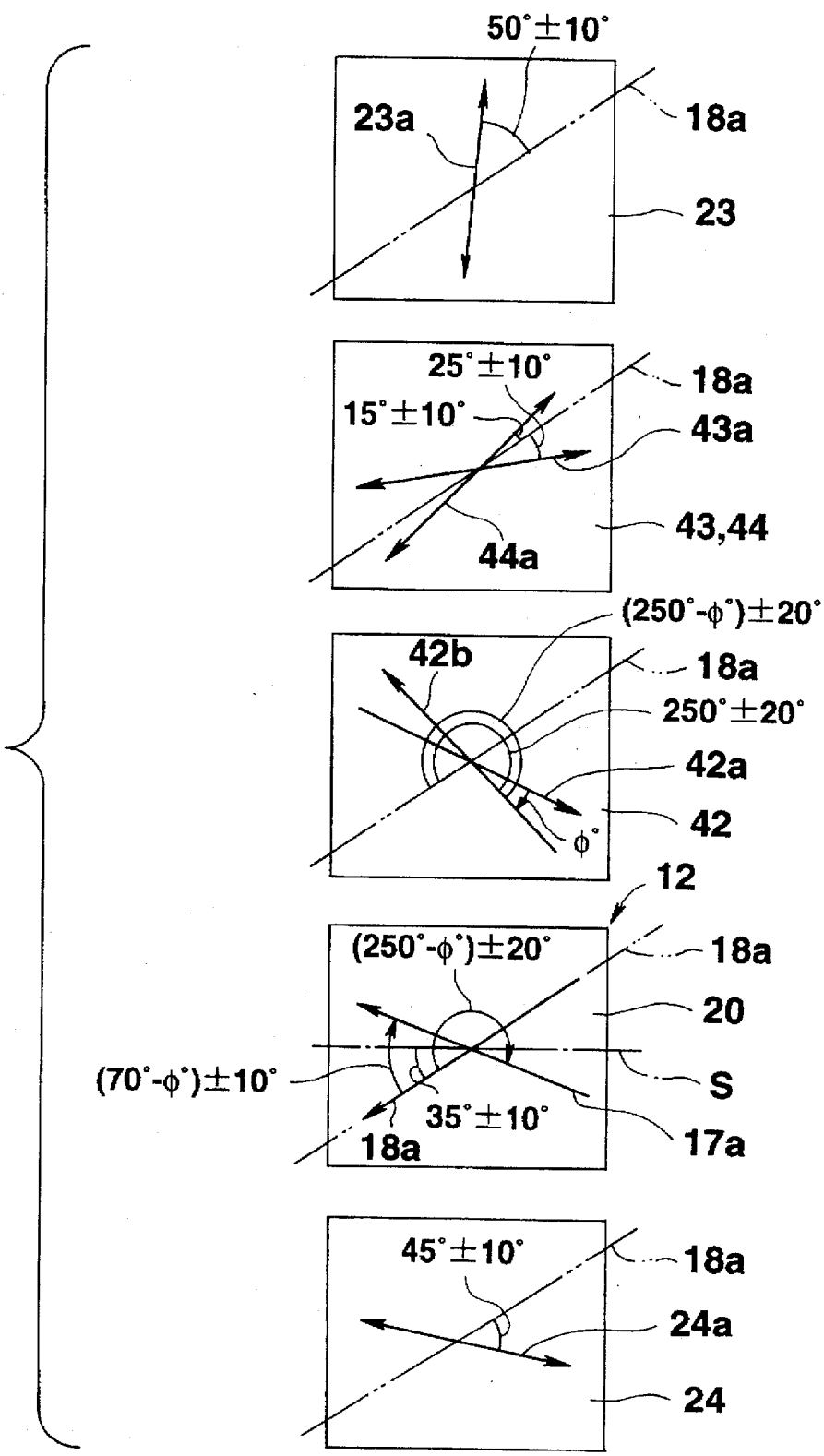
FIG. 18 is a view for explaining the positions/arrangement of the optical axes of optical elements in the sixth embodiment.

FIG. 18 illustrates a combination of the aligning treatment direction of the liquid crystal cell 12, the optical axes of the retardation plates 43 and 44, and the transmission axes of the polarizing plates 23 and 24 using the plan view of the constituent elements.

As shown in FIG. 18, a direction 18a of aligning treatment performed for the lower aligning film 18 of the liquid crystal cell 12 is inclined by 35±10° with respect to a reference line S, and liquid crystal molecules near the lower aligning film 18 are aligned along the aligning treatment direction 18a.

A direction 17a of aligning treatment performed for the upper aligning film 17 of the liquid crystal cell 12 is set to be a direction which crosses the aligning treatment direction 18a of the lower aligning film 18 at (70°−φ°)±10°, and the liquid crystal molecules near the upper aligning film 17 are aligned along the aligning treatment direction 17a.

In this manner, the liquid crystal molecules are aligned to be twisted clockwise from a lower glass substrate 14 to an upper glass substrate 13 by (250°−φ°)±20° (preferably ±10°).

A transmission axis 23a of the upper polarizing plate 23 is set to cross the aligning treatment direction 18a of the lower aligning film 18 at 50°±10° (85°±10° with respect to the reference line S).

The stretching axis (retardation axis having a maximum refractive index on a plane) 43a of the second retardation plate 43 is set to cross the aligning treatment direction 18a of the lower aligning film 18 at 25°±10° (10°±10° with respect to the reference line S).

A stretching axis 44a of the second retardation plate 44 is set to cross the aligning treatment direction 18a of the lower aligning film 18 at 15°±10° (50°±10° with respect to the reference line S).

An aligning direction 42a of liquid crystal molecules near the lower surface of the twist-aligned retardation plate 42 is set to be parallel to the aligning treatment direction 17a of the upper aligning film 17 ((70°−φ°)±20° with respect to the liquid crystal molecule aligning treatment direction 18a of the lower aligning film 18), and an aligning direction 42b of material molecules near the upper surface of the twist-aligned retardation plate 42 is set to cross the liquid crystal molecule aligning treatment direction 18a of the lower aligning film 18 at 250°±20° (35°±10° with respect to the reference line S).

A transmission axis 24a of the lower polarizing plate 24 is set to cross the aligning treatment direction 18a of the lower aligning film 18 at 45°±10° (10°±10° with respect to the reference line S).

The coloring principle of the color liquid crystal display device with the above arrangement will be described below.

Light incident from the upper direction in FIG. 17 on the upper surface side of the color liquid crystal display device is changed into linearly polarized light by transmitting the light through the upper polarizing plate 23. While the linearly polarized light is transmitted through the first and second retardation plates 43 and 44, the linearly polarized light receives a birefringence function corresponding to retardation values and optical positioning conditions such as the positions of the stretching axes 43a and 44a of the first and second retardation plates 43 and 44, thereby obtaining elliptically polarized light components whose polarized states are different from each other at the respective wavelengths. While these elliptically polarized light components having different wavelengths are transmitted through the twist-aligned retardation plate 42 and the liquid crystal cell 12, the elliptically polarized light components receive a birefringence function corresponding to the optical positioning conditions and retardation values of the twist-aligned retardation plate 42 and the liquid crystal cell 12, thereby changing their polarized states.

When the elliptically polarized light components which respectively have different polarized states at different wavelengths and receive the birefringence functions of the first and second retardation plates 43 and 44, the twist-aligned retardation plate 42, and the liquid crystal cell 12 are incident on the lower polarizing plate 24, only a polarized light component which coincides with the transmission axis 24a of the lower polarizing plate 24 is transmitted through the lower polarizing plate 24.

The light transmitted through the lower polarizing plate 24 is reflected by the reflecting plate 25 and emerges from the upper surface side of the color liquid crystal display device through a path reverse to the above optical path, thereby obtaining, as a display color, a synthesized color of exit light (a display color having a wavelength in which the spectral intensity of the exit light represents a peak).

The retardations of the first and second retardation plates 43 and 44 and the twist-aligned retardation plate 42 are set to be almost predetermined values, respectively, but the retardation of the liquid crystal cell 12 changes depending on the aligned state of the liquid crystal molecules. Therefore, when the aligned state of the liquid crystal molecules is changed by changing the value of a voltage applied to the liquid crystal cell 12, the retardation of the liquid crystal cell 12 changes, the birefringence function of the liquid crystal cell 12 changes, and the hue and luminance of a display color change.

More specifically, when no voltage is applied across scanning electrodes 15 and signal electrodes 16, light incident on the color liquid crystal display device receives the birefringence functions of the first and second retardation plates 43 and 44, the birefringence function of the twist-aligned retardation plate 42, and a birefringence function corresponding to the initial aligned state of the liquid crystal molecules, thereby obtaining elliptically polarized light components whose polarized states are different from each other at the respective wavelengths. The color of light transmitted through the lower polarizing plate 24, reflected by the reflecting plate 25, and emerging from the upper surface side of the color liquid crystal display device through the reverse path becomes a color corresponding to the retardations of the twist-aligned retardation plate 42 and the first and second retardation plates 43 and 44 and the retardation of the liquid crystal layer 41 set in an initial aligned state.

When a voltage is applied across the electrodes 15 and 16 of the liquid crystal cell 12, and the value of the effective voltage is increased, the liquid crystal molecules are gradually raised from an initial twisted state. The retardation of the liquid crystal cell 12 changes in accordance with the raised aligned state, and light incident on the color liquid crystal display device receives the birefringence functions of the twist-aligned retardation plate 42 and the first and second retardation plates 43 and 44 and the birefringence function corresponding to the changed retardation of the liquid crystal cell 12, thereby obtaining elliptically polarized light components corresponding to these polarizing functions. For this reason, a display color obtained at that time is different from a display color obtained when no voltage is applied to the liquid crystal cell 12.

When a voltage having a magnitude at which the liquid crystal molecules are almost vertically aligned is applied to the liquid crystal cell 12, the retardation of the liquid crystal cell 12 becomes almost "0". Therefore, the birefringence function of the liquid crystal cell 12 is almost zero, and light incident on the color liquid crystal display device is changed into only elliptically polarized light components corresponding to the birefringence functions of the twist-aligned retardation plate 42 and the first and second retardation plates 43 and 44. The elliptically polarized light components emerge from the color liquid crystal display device through the lower polarizing plate 24, the reflecting plate 25, and the reverse path thereof, and the light is colored with colors corresponding to the retardations of the twist-aligned retardation plate 42 and the first and second retardation plates 43 and 44.

Therefore, according to the above embodiment, an effective voltage applied to the liquid crystal layer 41 is controlled by controlling a signal applied across the scanning electrodes 15 and the signal electrodes 16 to control the birefringence characteristics of the liquid crystal layer 41, thereby displaying a desired color.

With the above arrangement, the display color can be controlled such that the aligning state of the liquid crystal layer 41 is controlled by controlling the voltage applied across the scanning electrodes 15 and the signal electrodes 16. The aligned state of the liquid crystal layer 41 is also changed by the temperature of the liquid crystal layer 41. That is, as the temperature of the liquid crystal layer 41 increases, the liquid crystal molecules are easily aligned perpendicularly to the substrates. For this reason, even if a voltage applied across the scanning electrodes 15 and the signal electrodes 16 is kept unchanged, different display colors can be displayed owing to changing the temperature of the liquid crystal layer 41.

Figure 19:
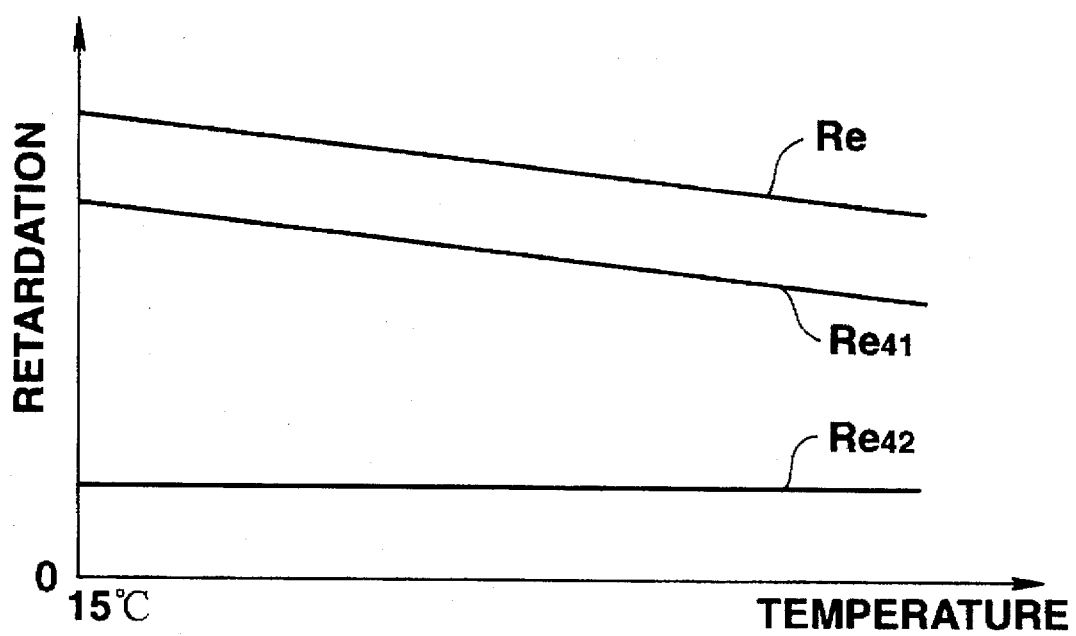
FIG. 19 is a graph showing the relationship between the retardations and temperatures of the optical elements in the sixth embodiment.

However, according to the above arrangement, the twist/alignment angle of 250°±20°, of the liquid crystal molecules, which is supposed to be required for the liquid crystal display device is obtained by the sum of the twist/ alignment angle of (250°−φ°)±20° of the liquid crystal layer 41 and the twist/alignment angle of φ of the polymer liquid crystal molecules of the twist-aligned retardation plate 42. In this case, a retardation $Re_{41}$ of the liquid crystal layer 41, as shown in FIG. 19, changes depending on the temperature of the liquid crystal layer 41. However, even when the temperature of the twist-aligned retardation plate 42 changes, a retardation $Re_{42}$ of the twist-aligned retardation plate 42 rarely changes. For this reason, a change in synthesized retardation Re of the liquid crystal layer 41 and the twist-aligned retardation plate 42 is smaller than a change in retardation, caused by a change in temperature, in a liquid crystal display device in which no twist-aligned retardation plate 42 is arranged, and the twist/alignment angle of a liquid crystal layer 41 is set to be 250°±20°.

Therefore, in the liquid crystal display device of this embodiment, the temperature dependency of a display color, i.e., a change in display color caused by a change in temperature, is small.

For example, the retardation of a liquid crystal layer having a twist/alignment angle of 250° at a reference temperature is represented by ReA, the retardation of a liquid crystal layer having a twist/alignment angle of 200° at the reference temperature is represented by ReB, and the retardation of a twist-aligned retardation plate having a twist/alignment angle of 50° is represented by ReC. In this case, it is assumed that ReA=ReB+ReC is satisfied at the reference temperature.

If the retardation ReA is decreased by a change in temperature, the retardation ReB decreases at a rate equal to that of the decrease in the retardation ReA, but the retardation ReC rarely changes. For this reason, the change in synthesized retardation (ReB+ReC) is smaller than the change in retardation ReA. A change in synthesized retardation of the liquid crystal display device of this embodiment caused by a change in temperature is small. Therefore, a desired display color can be stably obtained regardless of a change in temperature.

According to the above arrangement, since the first and second retardation plates 43 and 44 each having an optical biaxial property are used, the difference between a phase obtained when light is vertically transmitted through the liquid crystal layer 41 and a phase obtained when the light is obliquely transmitted through the liquid crystal layer 41 is compensated for by transmitting the light through the first and second retardation plates 43 and 44, thereby increasing a field angle.

With an increase in voltage (effective voltage) applied to the liquid crystal layer 41, the display color is sequentially changed to white, red, blue, and green in an order named. Three primary colors and white can be displayed, so that a desired color image can be satisfactorily obtained.

EXAMPLE

As an example, a color liquid crystal display device was formed under the following conditions. That is, the arrangement angles of the aligning treatment directions 17a and 18a of the aligning films 17 and 18, the aligning direction of the twist-aligned retardation plate 42, the stretching axes 43a and 44a of the first and second retardation plates 43 and 44, and the transmission axes 23a and 24a of the upper and lower polarizing plates 23 and 24 were respectively set to be the central angles shown in FIG. 18, the twist/alignment angle of x of the twist-aligned retardation plate 42 was set to be 50°, a sum d of the effective thicknesses of the liquid crystal layer 41 and the twist-aligned retardation plate 42 was set to be 6,800 nm, and a synthesized value Δn·d was set to be 1,390 nm. A signal supplied to the scanning electrodes 15 and the signal electrodes 16 was controlled to statically drive the color liquid crystal display device.

As a comparative example, a color liquid crystal display device was formed under the following conditions. That is, the twist/alignment angle of the liquid crystal layer 41 was set to be 250°, the arrangement angles of the stretching axes 43a and 44a of the first and second retardation plates 43 and 44 and the transmission axes 23a and 24a of the upper and lower polarizing plates 23 and 24 were respectively set to be the central angles shown in FIG. 18, a thickness d of the liquid crystal layer 41 was set to be 6,800 nm, and a value Δn·d was set to be 1,390 nm. Signals supplied to the scanning electrodes 15 and the signal electrodes 16 were controlled to statically drive the color liquid crystal display device.

When a temperature was set to be 25°, according to the color liquid crystal display device of the example, as shown in FIG. 20A, a display color became white when the effective value of an applied voltage was less than 2.03 V, the display color became red when the effective value of the applied voltage fell on the range between 2.14 V and 2.17 V, the display color became blue when the effective value of the applied voltage fell on the range between 2.19 v and 2.23 V, and the display color became green when the effective value of the applied voltage was not less than 2.28 V. In contrast to this, the relationship between an applied voltage and a display color at a temperature set to be equal to that in this example is shown in FIG. 20B.

When the temperature of the liquid crystal display device was changed while an applied voltage was kept constant, it was confirmed that a change is display color was smaller in the example than in the comparative example.

In the sixth embodiment, the two biaxial retardation plates 43 and 44 may be arranged between the lower polarizing plate 24 and the liquid crystal cell 12. The twist-aligned retardation plate 42 may be arranged on the lower side (reflecting side) of the liquid crystal cell 12. In this case, the twist-aligned retardation plate 42 must be arranged such that the molecule aligning direction 42b near the upper surface of the twist-aligned retardation plate 42 is parallel to the liquid crystal molecule aligning treatment direction 18a of the lower aligning film 18 of the liquid crystal cell.

[Seventh Embodiment]

Figure 21:
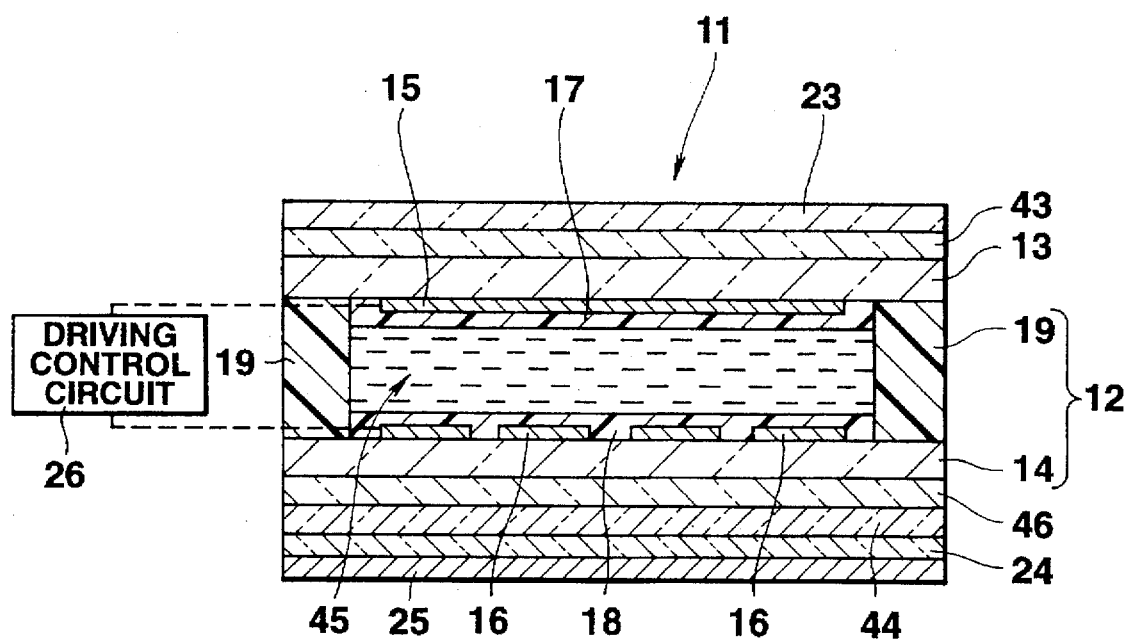
FIG. 21 is a sectional view showing a color liquid crystal display device as the seventh embodiment of the present invention.

In the sixth embodiment, the twist-aligned retardation plate 42 and the first and second retardation plates 43 and 44 are arranged between the upper glass substrate 13 and the upper polarizing plate 23. However, the positions of first and second retardation plates 43 and 44 can be arbitrarily determined. For example, as shown in FIG. 21, a first retardation plate 43 may be arranged between an upper substrate 13 and an upper polarizing plate 23, a twist-aligned retardation plate 46 may be stacked on a lower substrate 14, and a second retardation plate 44 may be arranged between the twist-aligned retardation plate 46 and a lower polarizing plate 24.

Figure 22:
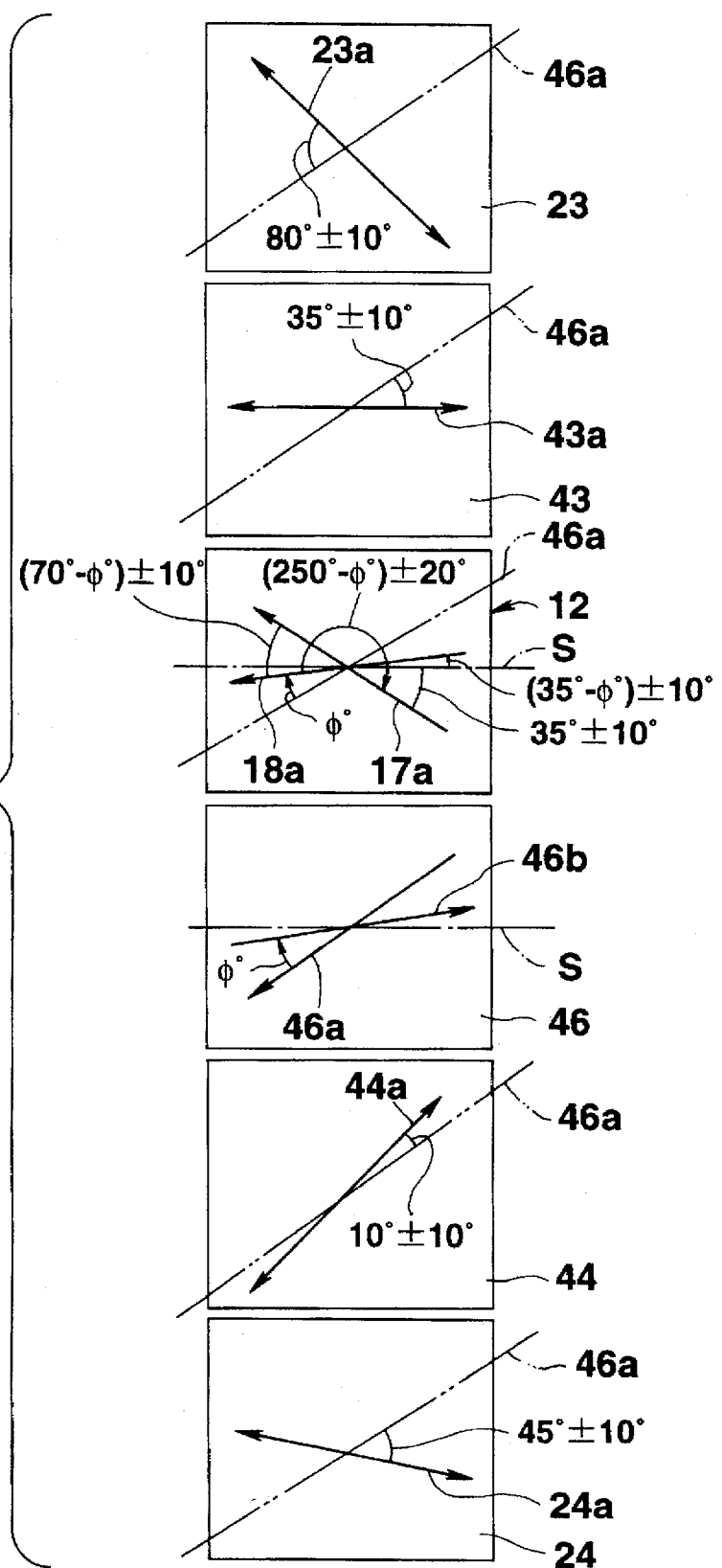
FIG. 22 is a view for explaining the positions/arrangement of the optical axes of the optical elements in the seventh embodiment.

When the first and second retardation plates 43 and 44 are arranged as described above, aligning treatment directions 17a and 18a of aligning films 17 and 18, aligning directions 46b and 46a of molecules near the upper and lower surfaces of the twist-aligned retardation plate 46, stretching axes 43a and 44a of the first and second retardation plates 43 and 44, and transmission axes 23a and 24a of the upper and lower polarizing plates 23 and 24 are arranged as shown in FIG. 22.

As shown in FIG. 22, the direction 18a of aligning treatment performed for the lower aligning film 18 is inclined by $(35°-\phi°)\pm10°$ with respect to a reference line S, the direction 17a of aligning treatment performed for the upper aligning film 17 is set to be a direction which crosses the aligning treatment direction 18a at $(70°-\phi°)\pm10°$. Liquid crystal molecules are aligned to be twisted clockwise from the lower glass substrate 14 to the upper glass substrate 13 by $(250°-\phi°) \pm20°$ (preferably $\pm10°$).

As in the sixth embodiment, an optical anisotropy $\Delta n$ of the liquid crystal is set to be about 0.2, and a thickness d of a liquid crystal layer 45 is set to be $6800\cdot(250-\phi)/250$.

The transmission axis 23a of the upper polarizing plate 23 is set to cross the aligning direction 46a of the molecules near the lower surface of the twist-aligned retardation plate 46 at $80°\pm10°$ ($45°\pm10°$ with respect to the reference line S).

The stretching axis 43a of the first retardation plate 43 is set to cross the molecule aligning direction 46a of the twist-aligned retardation plate 46 at $35°\pm10°$ ($0°\pm10°$ with respect to the reference line S).

The aligning direction 46b of the molecules near the upper surface of the twist-aligned retardation plate 46 is set to be parallel to the aligning treatment direction 18a of the lower aligning film 18, and the aligning direction 46a of the molecules near the lower surface of the twist-aligned retardation plate 46 is set to cross the aligning direction 46b of the molecules near the upper surface at $\phi$. The optical anisotropy $\Delta n$ of the twist-aligned retardation plate 46 is set to be about 0.2, and the thickness d of the twist-aligned retardation plate 46 is set to be $6800\cdot\phi/250$.

The stretching axis 44a of the second retardation plate 44 is set to cross the molecule aligning direction 46a of the twist-aligned retardation plate 46 at $10°\pm10°$ ($45°\pm10°$ with respect to the reference line S).

The transmission axis 24a of the lower polarizing plate 24 is set to cross the molecule aligning direction 46a of the twist-aligned retardation plate 46 at $45°\pm10°$ ($10°\pm10°$ with respect to the reference line S).

The first retardation plate 43 has a value $\Delta n$ of not less than 1500 nm, and preferably 1,600 nm$\pm$30 nm and an Rz value of 0.3 to 0.7 (preferably 0.45$\pm$0.1). The twist-aligned retardation plate 46 has a value $\Delta n$ of 0.2 and a thickness d of $6800\cdot(\phi/250)\pm100$ nm. The liquid crystal layer 45 has a value $\Delta n$ of 0.2 and a thickness d of $6800\cdot(250-\phi)/250\pm100$ nm. Therefore, a synthesized value $\Delta n\cdot d$ is 1,360 nm$\pm$100 nm, and the second retardation plate 44 has a value $\Delta n\cdot d$ of not less than 1500 nm, and preferably 1,600 nm$\pm$30 nm and an Rz value of 0.3 to 0.7 (preferably 0.45$\pm$0.1).

According to the above arrangement, with an increase in voltage applied to the liquid crystal layer 45, the display color is sequentially changed to red, purple, white, bluish purple, and black in an order named. When signals applied to scanning electrodes 15 and signal electrodes 16 are controlled to control the effective voltage applied to the liquid crystal layer 45 and control the display color, it is possible to display a color image.

As in the seventh embodiment, the twist/alignment angle (250°) and the layer thickness of liquid crystal molecules required (optimized) to control a display color are assured by the twist/alignment angle of $(250°\pm\phi°)$ of the liquid crystal layer 45, the thickness of the liquid crystal layer 45, the twist/alignment angle ($\phi°$) of the material molecules in the twist-aligned retardation plate 46, and the thickness of the twist-aligned retardation plate 46. For this reason, a change in retardation caused by a change in temperature is small. Therefore, a desired color can be stably displayed regardless of a change in temperature.

In the seventh embodiment, although the twist-aligned retardation plate 46 is arranged on the lower side (reflecting side) of the liquid crystal cell 12, the twist-aligned retardation plate 46 may be arranged on the upper side (incident side) of the liquid crystal cell 12. In this case, the twist-aligned retardation plate 46 must be arranged such that the molecule aligning direction 46a near the lower surface of the twist-aligned retardation plate 46 is parallel to the aligning treatment direction 17a of the upper aligning film 17.

[Eighth Embodiment]

According to the eighth embodiment, a homeotropic liquid crystal cell is arranged as a color adjusting optical element for a TN liquid crystal cell in which the twist alignment angle of liquid crystal molecules is 80° to 120°.

Figure 23:
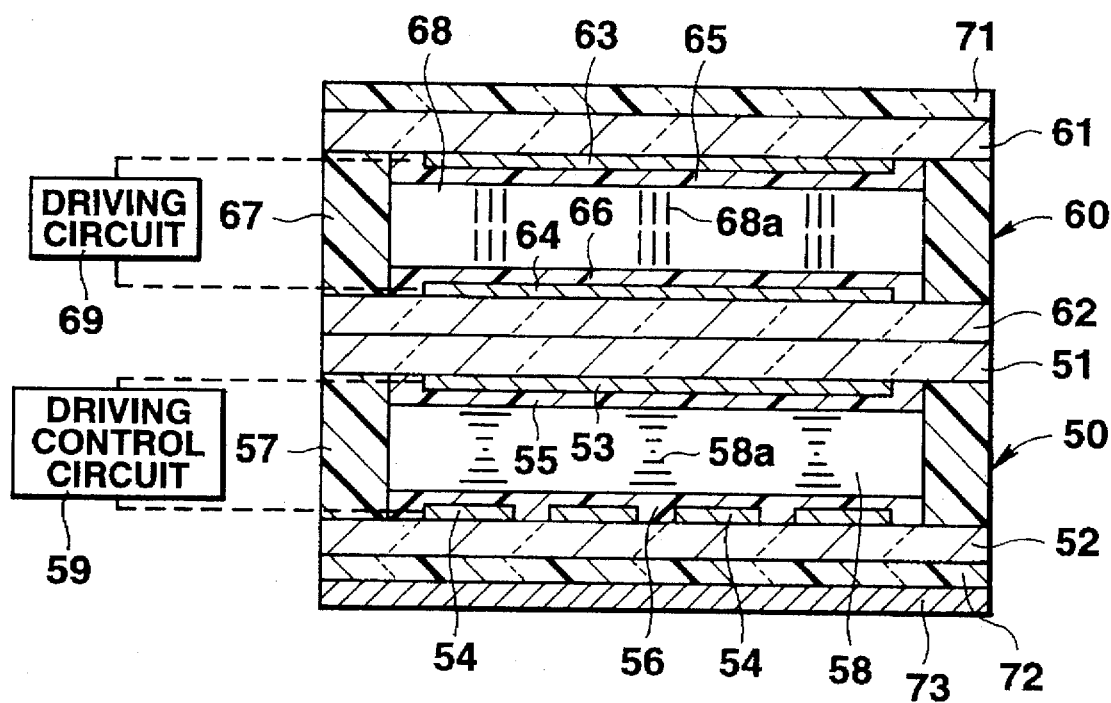
FIG. 23 is a sectional view showing a color liquid crystal display device as the eighth embodiment of the present invention.

Referring to FIG. 23, a display driving liquid crystal cell (to be referred to as a driving cell hereinafter) 50 is formed as follows. That is, transparent electrodes 53 and 54 for selectively applying a voltage are formed in areas of the liquid crystal layer, a pair of upper and lower transparent substrates 51 and 52 on which aligning films 55 and 56 are provided on the electrodes 53 and 54 are arranged to cause electrode-forming surfaces to oppose each other, and a liquid crystal 58 is sandwiched between both the substrates 51 and 52. Both the substrates 51 and 52 are joined with each other through a frame-like seal member 57, and the liquid crystal 58 is sealed in an area surrounded by the seal member 57 between both the substrates 51 and 52.

The aligning films 55 and 56 of both the substrates 51 and 52 are horizontal aligning films consisting of polyimide or the like. An aligning treatment (e.g., rubbing treatment) for regulating the aligning direction of liquid crystal molecules 58a is performed for the aligning films 55 and 56 in directions perpendicular to each other.

The liquid crystal 58 is a nematic liquid crystal having a positive dielectric anisotropy, and the molecules of the liquid crystal 58, aligning directions of which are regulated near the aligning films, are twist-aligned at a twist/alignment angle of 80° to 120° between both the substrates 51 and 52.

The liquid crystal cell of this embodiment is of a segment display type. The electrode 53 formed on the transparent substrate 51 is a common electrode, and the electrodes 54 formed on the lower substrate 52 are a plurality of segment electrodes having a shape corresponding to a display pattern. A driving control circuit 59 serving as a voltage applying means is connected to the segment electrodes 54 and the common electrode 53. The driving control circuit 59 applies a voltage corresponding to input information to the liquid crystal 58, and the birefringence effect of the liquid crystal 58 is changed in accordance with the applied voltage, thereby obtaining a color display corresponding to the input information.

A color adjusting liquid crystal cell (to be referred to as a color adjusting cell hereinafter) 60 is formed as follows. That is, single film-like transparent electrodes 63 and 64 for uniformly applying a voltage to the liquid crystal layer are formed, a pair of upper and lower transparent substrates 61 and 62 on which aligning films 65 and 66 are provided on the electrodes 63 and 64 are arranged to cause electrode-forming surfaces to oppose each other, and a liquid crystal 68 is sandwiched between both the substrates 61 and 62. Both the substrates 61 and 62 are joined with each other through a frame-like seal member 67, and the liquid crystal 68 is sealed in an area surrounded by the seal member 67 between both the substrates 61 and 62. Note that the color adjusting cell 60 is a liquid crystal cell having an area equal to that of the driving cell 50.

The aligning films 65 and 66 provided on both the substrates 61 and 62 of the color adjusting cell 60 are vertically aligning films consisting of a silane-based compound, and an aligning treatment (e.g., rubbing treatment) for regulating the lying direction of liquid crystal molecules 68a in the presence of a voltage is performed for the aligning films 65 and 66 in opposing directions parallel to each other.

The liquid crystal 68 of the color adjusting cell 60 is a nematic liquid crystal having a negative dielectric anisotropy. The molecules 68a of the liquid crystal 68 are homeotropically aligned to be raised perpendicularly to the surfaces of the aligning films 65 and 66.

A driving circuit 69 is connected to the single film-like electrodes 63 and 64 of the color adjusting cell 60, and a voltage adjusted to obtain a desired color display is applied to the liquid crystal 68 by the driving circuit 69.

The driving cell 50 and the color adjusting cell 60 are arranged to stack one on the other, and a pair of polarizing plates 71 and 72 are arranged to sandwich the two liquid crystal cells 50 and 60. Note that, in this embodiment, the color adjusting cell 60 is arranged on the incident side of the driving cell 50.

A reflecting plate 73 is a diffusing/reflecting plate consisting of an aluminum thin film having a roughened surface (reflecting surface). The reflecting plate 73 is arranged on the outer surface of the polarizing plate 72 arranged on the rear surface of the liquid crystal display device, i.e., on the lower side in FIG. 23.

Figure 24:
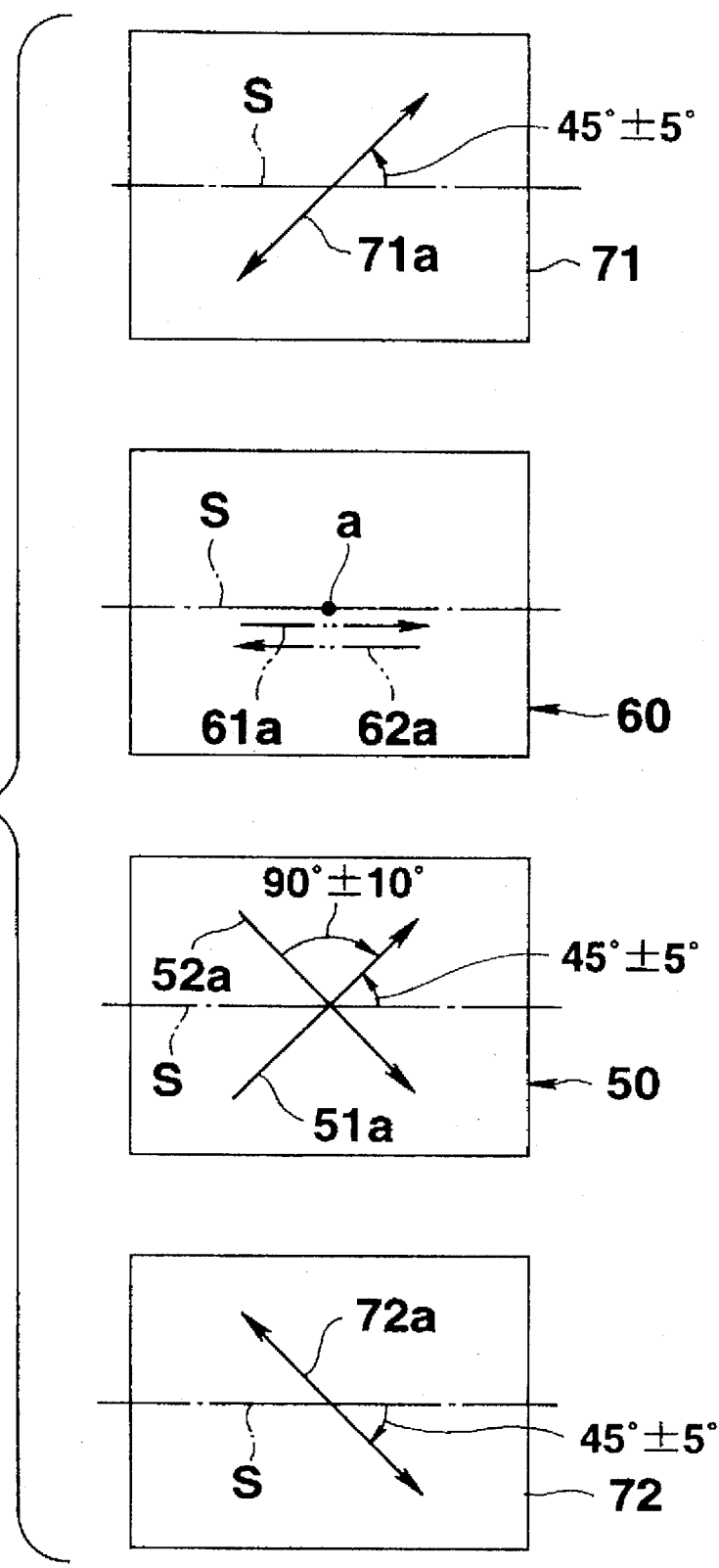
FIG. 24 is a view for explaining the positions/arrangement of the optical axes of the optical elements in the eighth embodiment.

FIG. 24 is a plan view showing the aligned states of the liquid crystal molecules 58a and 68a of the driving cell 50 and the color adjusting cell 60 and the directions of the transmission axes of the pair of polarizing plates 71 and 72.

As shown in FIG. 24, a liquid crystal molecule aligning direction 51a (the aligning treatment direction of the aligning film 55) on the upper substrate 51 side of the driving cell 50 is shifted counterclockwise by about 45° with respect to a reference line (a horizontal line in FIG. 24) S in FIG. 24, and a liquid crystal molecule aligning direction 52a (the aligning treatment direction of the aligning film 56) on the lower substrate 52 side is shifted clockwise by about 90°±10° with respect to the aligning direction 51a on the upper substrate 51 side in FIG. 24. The liquid crystal molecules 58a of the driving cell 50 are twist-aligned clockwise at a twist/alignment angle of about 90°±10° from the lower substrate 52 to the upper substrate 51.

Referring to FIG. 24, reference numeral 61a denotes an aligning treatment direction of the aligning film 65 on the upper substrate 61 side of the color adjusting cell 60; and 62a, an aligning treatment direction of the aligning film 66 on the lower substrate 62 side. The aligning treatment directions 61a and 62a on the substrate 61 side and the substrate 62 side are parallel to each other and oppose each other.

The color adjusting cell 60 is arranged such that the transparent substrates 61 and 62, i.e., the lying direction of the liquid crystal molecules 68a in the presence of a voltage is set to be parallel to the reference line S. Note that a parallel axis a of the liquid crystal molecules 68a has the same direction as the normal direction of the color adjusting cell 60 because the color adjusting cell 60 is constituted by homeotropically aligning the liquid crystal molecules 68a.

In addition, of the pair of polarizing plates 71 and 72, the upper polarizing plate 71 arranged on the color adjusting cell 60 side is arranged so that the transmission axis 71a is shifted counterclockwise by about 45° with respect to the reference line S in FIG. 24. More specifically, a transmission axis 71a of the upper polarizing plate 71 is almost parallel to the aligning treatment direction 51a on the upper substrate 51 side of the driving cell 50, and is obliquely shifted by 45°±5° with respect to the liquid crystal molecule lying direction (aligning treatment directions 61a and 62a) in the presence of a voltage in the color adjusting cell 60.

The lower polarizing plate 72 arranged on the driving cell 50 side has a transmission axis 72a shifted clockwise by 45°±5° with respect to the reference line S in FIG. 24. For this reason, the transmission axis 72a of the lower polarizing plate 72 is parallel to the aligning treatment direction 52a of the lower substrate 52 of the driving cell 50 and almost perpendicular to the transmission axis 71a of the upper polarizing plate 71.

This color liquid crystal display device is a reflection type color liquid crystal display device in which external light (natural light or indoor illumination light) is incident on a front surface side (upper side in FIG. 23) and reflected by the reflecting plate 73 on the rear surface side to perform a display. The color liquid crystal display device is driven such that an ON voltage is selectively applied across the common electrode 53 and the segment electrodes 54 of the driving cell 50, and a voltage applied across the electrodes 63 and 64 of the color adjusting cell 60 is controlled.

Figure 25:
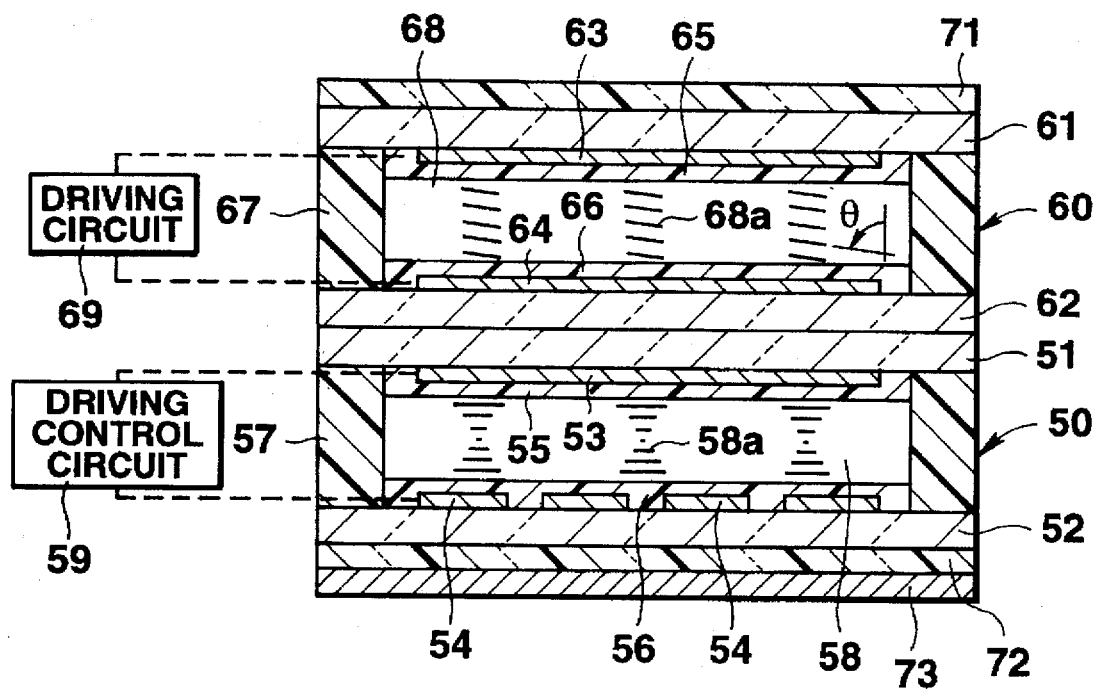
FIG. 25 is a sectional view showing a state of the color liquid crystal display device of the eighth embodiment in an operation step different from that in FIG. 23.

FIG. 25 shows a state in which a voltage is applied across the electrodes 63 and 64 of the color adjusting cell 60. The transparent electrodes 63 and 64 of the color adjusting cell 60 are respectively single film-like electrodes covering the entire area of the liquid crystal layer. For this reason, when a voltage is applied across the electrodes 63 and 64, the liquid crystal molecules 68a of the color adjusting cell 60, in the entire area of the liquid crystal layer are laid and aligned from a homeotropically aligned state serving as an initial aligned state in one direction (direction along the aligning treatment directions 61a and 62a on the substrate 61 side and the substrate 62 side).

At this time, a lying angle (angle with respect to the normal of the color adjusting cell 60) θ of the liquid crystal molecules 68a is determined depending on the voltage applied to the color adjusting cell 60. As the applied voltage is increased, the lying angle θ increases accordingly.

Figure 26:
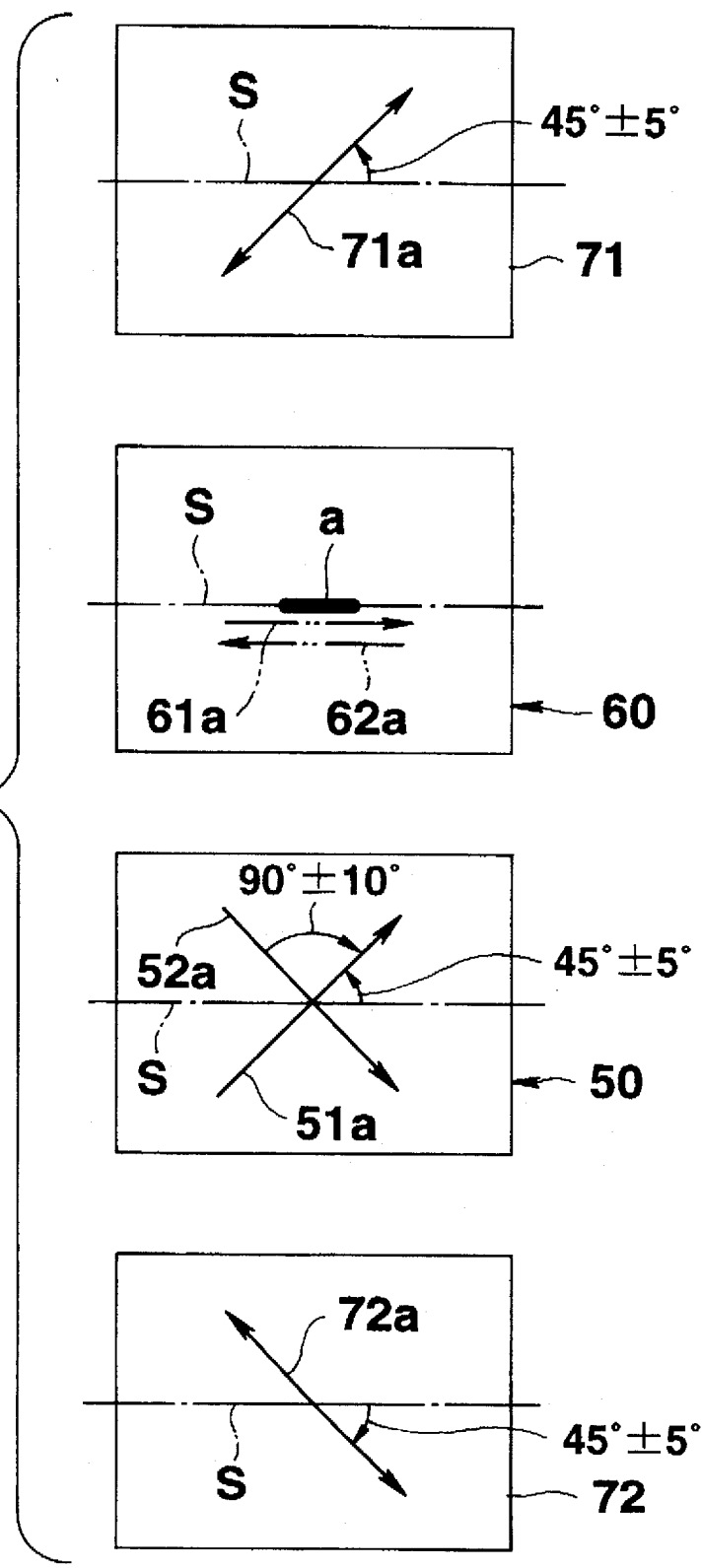
FIG. 26 is a view for explaining the positions/arrangement of the optical axes of the optical elements in the operation step of FIG. 25.

FIG. 26 is a plan view showing the aligned state of the liquid crystal molecules 58a and 68a of the driving cell 50 and the color adjusting cell 60 and the directions of the transmission axes of the pair of polarizing plates 71 and 72 when a voltage is applied across the electrodes 63 and 64 of the color adjusting cell 60. In this case, the parallel axis a of the liquid crystal molecules 68a of the color adjusting cell 60 has a direction almost parallel to the reference line S.

The display operation of the color liquid crystal display device will be described below. In this color liquid crystal display device, linearly polarized light incident on the front surface side of the color liquid crystal display device through the upper polarizing plate 71 passes through the color adjusting cell 60, passes through the driving cell 50, and is incident on the lower polarizing plate 72.

In the color adjusting cell 60, when the liquid crystal molecules 68a are homeotropically aligned as shown in FIG. 23, an apparent refractive index anisotropy Δn of the liquid crystal 68 is "0". For this reason, light can be transmitted through the color adjusting cell 60 without being double-refracted. Therefore, when no voltage is applied across the electrodes 63 and 64 of the color adjusting cell 60, i.e., when the liquid crystal molecules 68a of the color adjusting cell 60 are set in a homeotropically aligned state serving as an initial aligned state, the color liquid crystal display device performs a display operation as that of a liquid crystal display device constituted by the driving cell 50 and the pair of upper polarizing plates 71 and 72.

More specifically, at this time, the linearly polarized light incident on the color adjusting cell 60 through the upper polarizing plate 71 is incident on the driving cell 50 through the color adjusting cell 60 while keeping the polarized state of the linearly polarized light.

In the absence of an ON voltage, the liquid crystal molecules 58a of the driving cell 50 are set in an initial twist-aligned state. When the ON voltage is applied across the electrodes 53 and 54, the liquid crystal molecules 58a are raised and aligned perpendicularly to the surfaces of the substrates 51 and 52 by the ON voltage.

For this reason, in a background area corresponding to an area in which the liquid crystal molecules 58a of the driving cell 50 are set in a twist-aligned state, linearly polarized light incident on the driving cell 50 receives the rotatory polarizing function of the liquid crystal molecules 58a, and the light is rotatorily polarized at 90°, emerges from the driving cell 50, and is incident on the lower polarizing plate 72.

In a display area corresponding to an area in which the liquid crystal molecules 58a of the driving cell 50 are raised and aligned by applying an ON voltage, when the birefringence effect (Δn) of the liquid crystal 58 apparently becomes "0", the rotatory polarizing function of the driving cell 50 is almost zero. For this reason, linearly polarized light incident on the driving cell 50 emerges from the driving cell 50 and is incident on the lower polarizing plate 72 while keeping the polarized state of the linearly polarized light.

In this embodiment, the transmission axes 71a and 72a of the upper and lower polarizing plates 71 and 72 are almost perpendicular to each other. For this reason, in the background area corresponding to the area in which the liquid crystal molecules 58a of the driving cell 50 are set in a twisted and aligned state, linearly polarized light emerging from the driving cell 50 and incident on the lower polarizing plate 72 is transmitted through the lower polarizing plate 72, thereby obtaining a display "white". In the display area corresponding to the area in which the liquid crystal molecules 58a of the driving cell 50 are raised and aligned, linearly polarized light emerging from the driving cell 50 and incident on the lower polarizing plate 72 is absorbed by the lower polarizing plate 72, thereby obtaining a display "black".

More specifically, in the color liquid crystal display device, when no voltage is applied across the electrodes 63 and 64 of the color adjusting cell 60, as in a positive display type TN liquid crystal display device, display information is displayed in "black" on a "white" background.

When a voltage applied across the transparent electrodes 63 and 64 of the color adjusting cell 60 to lay the liquid crystal molecules 68a from the homeotropically aligned state in one direction, the color adjusting cell 60 has the same birefringence effect as that of a retardation plate.

More specifically, a liquid crystal cell whose liquid crystal molecules are aligned to be laid in one direction with respect to the normal direction of the liquid crystal cell may be considered as a retardation plate having a retardation axis whose direction is the same as that of the parallel axis of the liquid crystal molecules. For this reason, when the liquid crystal molecules 68a of the color adjusting cell 60 are laid and aligned in one direction as shown in FIG. 25, the color adjusting cell 60 has the same birefringence effect as that of a retardation plate having a retardation axis whose direction is the same as that of the molecule parallel axis a shown in FIG. 26.

At this time, an apparent refractive index anisotropy Δn of the liquid crystal 68 of the color adjusting cell 60 is expressed by equation (9). This refractive index anisotropy Δn changes depending on a lying angle θ (FIG. 25) of the liquid crystal molecules 68a.

$$\Delta n = \frac{n_e n_o}{\sqrt{n_e^2 \cos^2\theta + n_o^2 \sin^2\theta}} - n_o \quad (9)$$

where $N_e$: refractive index with respect to extraordinary light $N_o$: refractive index with respect to ordinary light For this reason, a voltage is applied across the electrodes 63 and 64 of the color adjusting cell 60 to lay and align the liquid crystal molecules 68a in one direction. In this case, while linearly polarized light incident on the color adjusting cell 60 through the upper polarizing plate 71 passes through the color adjusting cell 60, the polarized state of the linearly polarized light is changed by the birefringence effect of the color adjusting cell 60 to obtain elliptically polarized light, and this elliptically polarized light is incident on the driving cell 50.

As described above, the liquid crystal molecules 58a of the driving cell 50 are set in a twisted/aligned state in the absence of an ON voltage. When the ON voltage is applied across the electrodes 53 and 54, the liquid crystal molecules 58a are raised and aligned almost perpendicularly to the surfaces of the substrates 51 and 52 by the ON voltage. For this reason, in a background area corresponding to an area in which the liquid crystal molecules 58a of the driving cell 50 are set in a twisted/aligned state, linearly polarized light incident through the upper polarizing plate 71 is changed into elliptically polarized light by the birefringence effect of the color adjusting cell 60, and the elliptically polarized light has a polarized state changed by the rotatory polarizing function of the driving cell 50 and is incident on the lower polarizing plate 72.

More specifically, in this background area, the linearly polarized light incident through the upper polarizing plate 71 receives the birefringence effect of the color adjusting cell 60 and the rotatory polarizing function of the driving cell 50 to obtain elliptically polarized light components whose polarized states are different from each other at the respective wavelengths, and the elliptically polarized light components are incident on the lower polarizing plate 72. Of the elliptically polarized light components, only polarized light components transmitted through the lower polarizing plate 72 emerge through the lower polarizing plate 72. The exit light is colored in a color corresponding to the ratio of the transmitted wavelength light components.

In a display area corresponding to an area in which the liquid crystal molecules 58a of the driving cell 50 are raised and aligned, the rotatory polarization function of the driving cell 50 becomes almost zero. For this reason, elliptically polarized light components which receive only the birefringence effect of the color adjusting cell 60 are incident on the lower polarizing plate 72. Of the elliptically polarized light components, only elliptically polarized light components transmitted through the lower polarizing plate 72 emerge through the lower polarizing plate 72. The exit light is colored in a color corresponding to the ratio of the transmitted wavelength light components.

The color of the exit light in the display area is different from the color of exit light in the background area because the polarized state of elliptically polarized light incident on the lower polarizing plate 72 in the background area is different from that in the display area. Therefore, on the background colored in a certain color, display information is displayed in a color different from that of the background color.

The color liquid crystal display device of this embodiment is a reflection type color liquid crystal display device in which the reflecting plate 73 is arranged on the rear surface side. Light emerging from the lower polarizing plate 72 is reflected by the reflecting plate 73 and emerges from the front surface side of the color liquid crystal display device through the lower polarizing plate 72, the driving cell 50, the color adjusting cell 60, and the upper polarizing plate 71.

The liquid crystal molecules 68a of the color adjusting cell 60, as described above, are laid and aligned from a homeotropically aligned state serving as an initial aligned state in one direction by applying a voltage to the color adjusting cell 60. In this case, the lying angle θ of the liquid crystal molecules 68a is determined depending on the value of the voltage applied to the color adjusting cell 60.

The birefringence effect (corresponding to the retardation of a retardation plate) of the color adjusting cell 60 is determined depending on a product Δn·d of the refractive index anisotropy Δn of the liquid crystal 68 and the thickness d of the liquid crystal layer. However, the apparent refractive index anisotropy Δn of the liquid crystal 68 changes in accordance with the lying angle θ of the liquid crystal molecules 68a, as indicated by equation (9). For this reason, the birefringence effect of the color adjusting cell 60 changes in accordance with the aligned state of the liquid crystal molecules 68a.

Therefore, when the birefringence effect of the color adjusting cell 60 is changed by controlling the voltage applied to the color adjusting cell 60, the polarized state of elliptically polarized light incident on the lower polarizing plate 72 changes accordingly, and exit light in the background area and exit light in the display area are colored in different colors, respectively.

In this manner, in the color liquid crystal display device, light is colored by the birefringence effects of the display driving liquid crystal cell 50 and the color adjusting liquid crystal cell 60 and the polarizing functions of the pair of upper polarizing plates 71 and 72 without using a color filter having a low transmittance. For this reason, although the color liquid crystal display device is a reflection type liquid crystal display device, a bright color display can be obtained by increasing the transmittance of the color liquid crystal display device.

In addition, in the color liquid crystal display device, a monochrome display can be obtained by applying no voltage to the color adjusting cell 60, or a color display can be obtained by applying a voltage to the color adjusting cell 60. In addition to this effect, not only a display color but also a background color can be arbitrarily changed by controlling the value of the voltage applied to the color adjusting cell 60. For this reason, a variety of displays can be obtained.

In the above embodiment, the transmission axis 71a of the upper polarizing plate 71 is set to be almost parallel to the liquid crystal molecule aligning direction 51a on the upper substrate 51 side of the driving cell 50, and the transmission axis 72a of the lower polarizing plate 72 is set to be almost parallel to the liquid crystal molecule aligning direction 52a on the lower substrate 52 side of the driving cell 50. However, the transmission axes 71a and 72a of the polarizing plates 71 and 72 may be set to be almost perpendicular to the liquid crystal aligning directions 51a and 52a on the substrate 51 side and the substrate 52 side of the driving cell 50.

The transmission axes 71a and 72a of the upper and lower polarizing plates 71 and 72 are set to be almost perpendicular to each other. However, the transmission axes 71a and 72a of both the polarizing plates 71 and 72 are set to be almost parallel to each other. In this case, a negative display type liquid crystal display device in which "white" and "black" in a monochrome display are obtained by inverting "white" and "black" in a monochrome display of the above embodiment.

In the above embodiment, the shift angles between the lying/aligning directions (the aligning treatment directions on the substrate 61 side and the substrate 62 side) of the liquid crystal molecules 68a of the color adjusting cell 60 and the transmission axes 71a and 72a of the pair of polarizing plates 71 and 72 are set to be an angle of 45°±5°. However, this shift angle may be arbitrarily set.

When the liquid crystal molecules 68a of the color adjusting cell 60 are laid and aligned in one direction, a birefringence effect to linearly polarized light is maximum when the linearly polarized light is incident on the color adjusting cell 60 at a shift angle of 45° with respect to the direction of the parallel axis a of the liquid crystal molecules 68a. For this reason, in order to obtain vivid colored light, at least the shift angle between the transmission axis 71a of the upper polarizing plate 71 arranged on the incident side of the color adjusting cell 60 and the lying/aligning direction of the liquid crystal molecules 68a of the color adjusting cell 60 is desirably set to be 45°±5°.

In the above embodiment, although the twist/alignment angle of the liquid crystal molecules 58a of the driving cell 50 is set to be about 90°, the liquid crystal molecule twist/alignment angle of the driving cell 50 is not limited to 90° and may be set to be 180° to 270°.

In this case, since the birefringence function of the driving cell 50 is enhanced, a distinct monochrome display cannot be easily obtained. However, a colorful color display having a background color and a display color changed into a plurality of chromatic colors can be vividly obtained.

In addition, the homeotropic alignment type color adjusting liquid crystal cell may be arranged on the reflecting plate side of the driving cell.

[Ninth Embodiment]

In the ninth embodiment, a homogeneous alignment type liquid crystal cell is arranged in place of a homeotropic alignment type liquid crystal cell used as a color adjusting cell in the eighth embodiment. The same reference numerals as in the eighth embodiment denote the same parts in the ninth embodiment, and a description thereof will be omitted.

Figure 27:
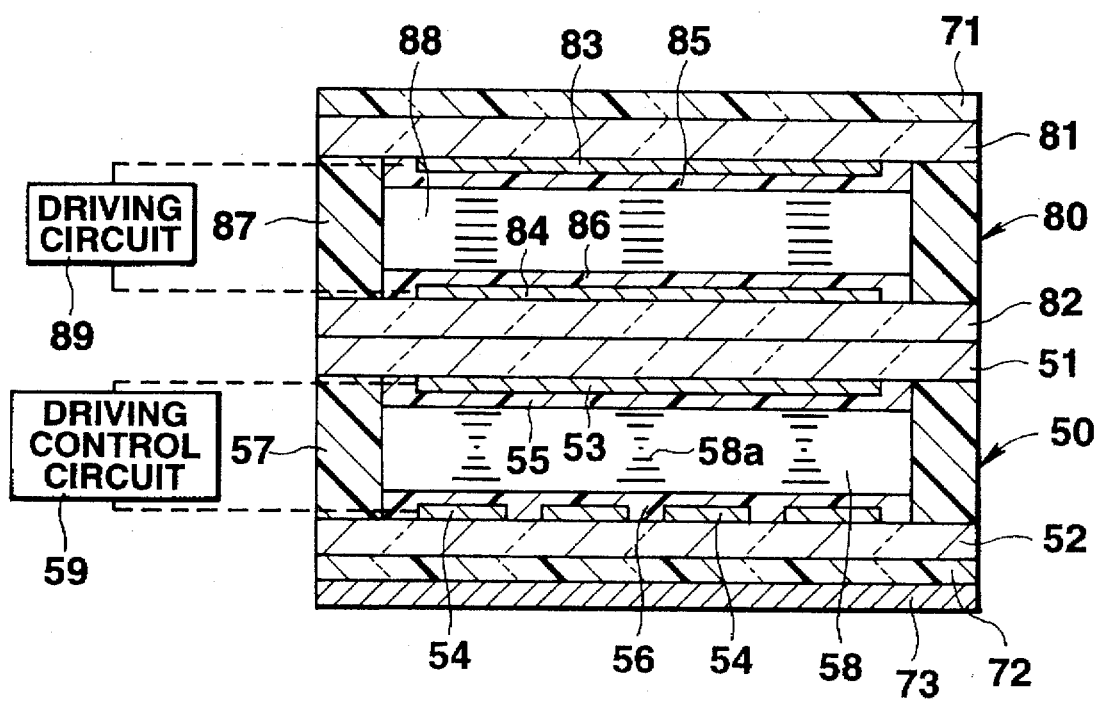
FIG. 27 is a sectional view showing a color liquid crystal display device as the ninth embodiment of the present invention.

Referring to FIG. 27, a homogeneous alignment type color adjusting cell 80 is arranged on the incident side (upper side in FIG. 27) of a driving cell 50. In this color adjusting cell 80, single film-like transparent electrodes 83 and 84 are formed on a pair of transparent substrates 81 and 82, respectively, and horizontal aligning films 85 and 86 consisting of polyimide or the like are stacked on the transparent electrodes 83 and 84, respectively. In addition, the pair of transparent substrates 81 and 82 are arranged to oppose each other via a seal member 87, and a nematic liquid crystal having a positive dielectric anisotropy and serving as a liquid crystal 88 is sealed in a space between the aligning films 85 and 86 arranged to oppose each other. A driving circuit 89 is connected to the single film-like electrodes 83 and 84 of the color adjusting cell 80, and a voltage adjusted to obtain a desired color display is applied to the liquid crystal 88 by the driving circuit 89.

Figure 28:
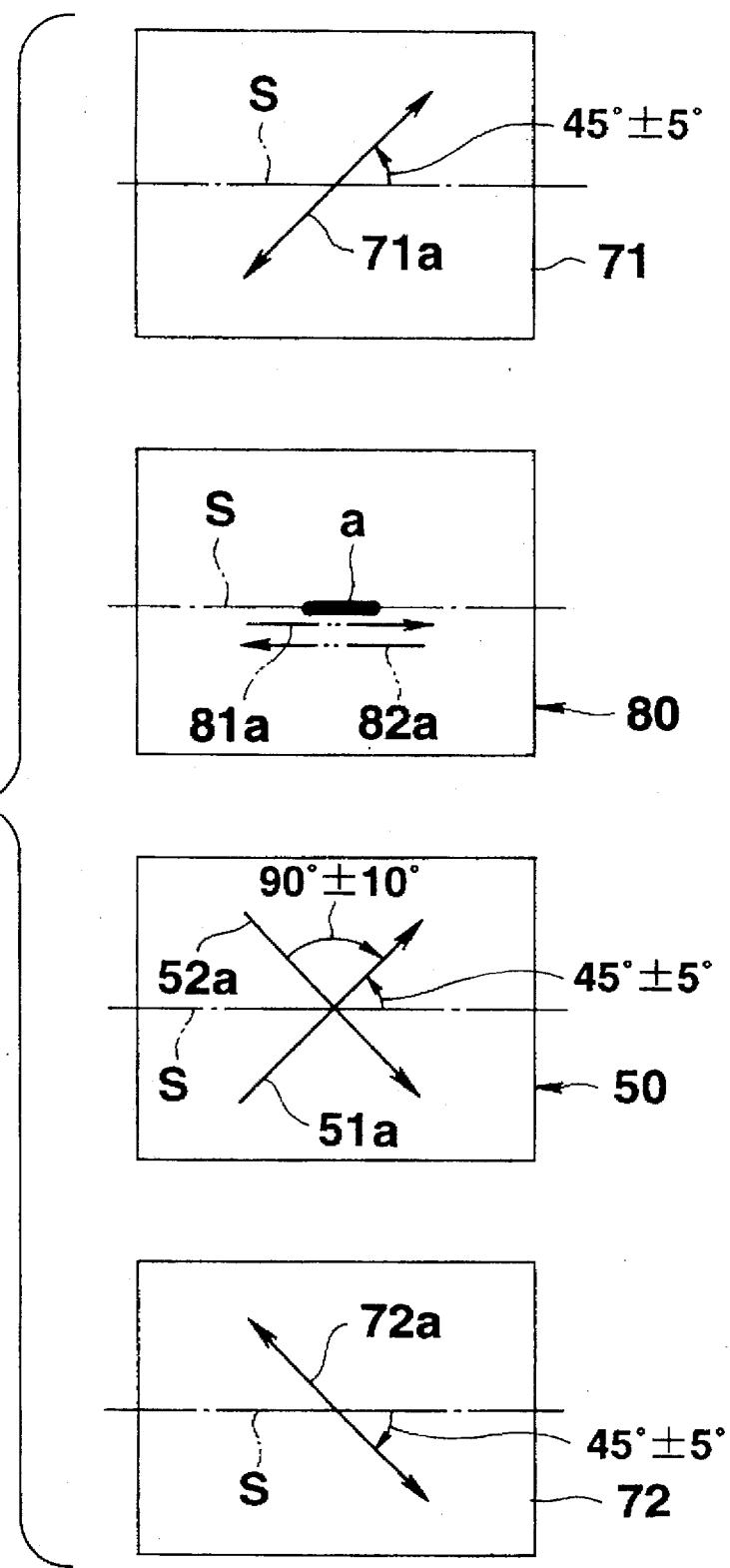
FIG. 28 is a view for explaining the positions/arrangement of the optical axes of the optical elements in the ninth embodiment.

As shown in FIG. 28, an aligning treatment is performed for the aligning films 85 and 86 in directions which are parallel to and oppose each other. In this manner, in an initial state in which no voltage is applied to the electrodes 83 and 84, the liquid crystal molecules are almost aligned parallel along aligning treatment directions 85a and 86a, and the liquid crystal molecules are gradually raised and aligned from a homogeneously aligned state in accordance with the voltage applied to the electrodes 83 and 84.

A display operation performed when this homogeneous alignment type cell is used as the color adjusting cell 80 is as follows.

In a color liquid crystal display device in which the homogeneous alignment type cell is used as the color adjusting cell 80, when a voltage for raising and aligning liquid crystal molecules 88a almost perpendicularly to the surfaces of the substrates 81 and 82 is applied across the electrodes 83 and 84 of the color adjusting cell 80, i.e., when the parallel axis of the liquid crystal molecules 88a has the same direction as the normal direction of the color adjusting cell 80, an apparent refractive index anisotropy Δn of the liquid crystal 88 becomes "0". At this time, the color liquid crystal display device performs the same display operation as that of a liquid crystal display device constituted by the driving cell 50 and a pair of polarizing plates 71 and 72.

In a display obtained at this time, a display in a background area corresponding to an area in which liquid crystal molecules 58a of the driving cell 50 are twisted and aligned is "white", and a display in a display area corresponding to an area in which the liquid crystal molecules 58a of the driving cell 50 are raised and aligned is "black".

In a state in which no voltage is applied across the electrodes 83 and 84 of the color adjusting cell 80 (the liquid crystal molecules 88a are homogeneously aligned) or a state in which a relatively low voltage is applied across the electrodes 83 and 84 to obliquely raise and align the liquid crystal molecules 88a to some extent from the homogeneously aligned state, the color adjusting cell 80 has the same birefringence effect as that of a retardation plate. For this reason, at this time, while linearly polarized light incident on the color adjusting cell 80 through the upper polarizing plate 71 passes through the color adjusting cell 80, the linearly polarized light is changed by the birefringence effect of the color adjusting cell 80 to obtain elliptically polarized light components whose polarized states are different from each other at the respective wavelengths. The elliptically polarized light components are incident on the driving cell 50.

More specifically, in the ninth embodiment, unlike the eighth embodiment, the relationship between a voltage applied to the color adjusting cell and a display operation is reversed. When a sufficient voltage is applied to the color adjusting cell 80, the liquid crystal molecules are homeotropically applied almost perpendicularly to the substrates, and a monochrome display can be obtained. When no voltage is applied to the color adjusting cell 80, and the voltage applied to the color adjusting cell 80 is gradually increased from the state in which no voltage is applied to the color adjusting cell 80, a colorful color display in which a background color and a display color are changed into a plurality of chromatic colors. Examples of the relationship between the background colors and the display colors with respect to the applied voltages are shown in Table 1. Note that, in these examples, the color adjusting cell has $n_e=1.1$ and $n_o=1.0$, and the liquid crystal layer thickness d is defined as d=8.3 μm.

TABLE 1

| Applied Voltage | Background Color | Display Color |
| --- | --- | --- |
| 0 V | purple | yellowish green |
| 1.5 V | yellow | dark blue |
| 2.1 V | light blue | orange |

The color liquid crystal display devices detailed described in the first to ninth embodiments are reflection type color liquid crystal display devices. However, the present invention is not limited to the reflection type color liquid crystal display device. The present invention can be applied to a transmission type color liquid crystal display device having no reflecting plate, or a semi-transmission type color liquid crystal display device which can be used as a reflection or transmission type color liquid crystal display device and comprises a semi-transmission reflecting plate. More specifically, in each of the first to ninth embodiments, a reflecting plate may be replaced with a semi-transmission reflecting plate, and a backlight may be arranged, or a reflecting plate may be replaced with a backlight.

Each of the first to seventh embodiments describes a simple matrix type color liquid crystal display device, and each of the eighth and ninth embodiments describes a segment display type color liquid crystal display device. The first to ninth embodiments are not limited to these color liquid crystal display devices. That is, the liquid crystal display device of each of the first to seventh embodiments may be of a segment display type, and the liquid crystal display device of each of the eighth and ninth embodiments may be of a simple matrix type. The liquid crystal display device of each of the first to ninth embodiments may be an active matrix type color liquid crystal display device in which thin-film transistors serving as active switching elements are respectively arranged for pixels formed in a matrix.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A color liquid crystal display device comprising:
    a pair of substrates having opposing surfaces, electrodes respectively formed on the opposing surfaces and aligning films respectively provided on the opposing surfaces of said substrates to cover said electrodes, said aligning films being subjected to aligning treatments in predetermined directions;
    a liquid crystal layer, arranged between said substrates and having liquid crystal molecules aligned to be twisted at a twist/alignment angle from one substrate to the other substrate;
    a pair of polarizing plates, arranged outside of said substrates to sandwich said substrates, for linearly polarizing incident light and analyzing light elliptically polarized by a birefringence function to color exit light;
    voltage applying means, connected to said electrodes, for changing a voltage applied to said liquid crystal layer to change an aligned state of the liquid crystal molecules such that a color of the exit light is changed by a change in polarized state of light transmitted through said liquid crystal layer; and
    color adjusting optical element means, arranged between said polarizing plates and having birefringence characteristics, retardation of which is set to be not less than 1500 nm for adjusting a hue of the exit light.

2. A device according to claim 1, wherein the liquid crystal molecules of said liquid crystal layer are aligned to be twisted at a twist/alignment angle of 180° to 270° from one substrate to the other substrate.

3. A device according to claim 2, wherein said color adjusting optical element means has at least one complex refracting element having birefringence characteristics, a complex refractive index expressed by a complex number N which satisfies $$N = n - ik$$

where n and k are a refractive index and an absorption coefficient, respectively, and characteristics in which the absorption coefficient k is in inverse proportion to a wavelength of light.

4. A device according to claim 3, wherein said complex refracting element satisfies $$N_X > N_Z > N_Y$$

where $N_X$, $N_Y$, and $N_Z$ are complex refractive indexes in a direction in which a maximum refractive index is obtained on a plane of said complex refracting element, a direction perpendicular to the direction in which the maximum refractive index is obtained on the plane, and a direction of thickness, respectively.

5. A device according to claim 4, further comprising two complex refracting elements arranged between one substrate of said pair of substrates and one of the two polarizing plates opposing said one substrate.

6. A device according to claim 4, further comprising two complex refracting elements, one of which is arranged between one substrate of said pair of substrates and one of the two polarizing plates opposing said one substrate, and the other of which is arranged between the other substrate and the other polarizing plate opposing said other substrate.

7. A device according to claim 2, wherein said color adjusting optical element means has a twist-aligned retardation plate whose material molecules are aligned to be twisted from one surface of said color adjusting optical element means to the other surface of said color adjusting optional element means.

8. A device according to claim 7, wherein a twisting direction of the material molecules of said twist-aligned retardation plate is opposite to a twist-aligning direction of the liquid crystal molecules of said liquid crystal layer, and a twist/alignment angle of the material molecules is equal to a twist/alignment angle of the liquid crystal molecules.

9. A device according to claim 7, wherein said twist-aligned retardation plate is stacked on one substrate of said pair of substrates, a twist-aligning direction of the material molecules of said twist-aligned retardation plate is the same as a twist-aligning direction of the liquid crystal molecules of said liquid crystal layer, and a sum of a twist/alignment angle of the material molecules and a twist/alignment angle of the liquid crystal molecules is 230° to 270°.

10. A device according to claim 9, further comprising two biaxial retardation plates which are arranged between said pair of polarizing plates and satisfy $$n_x > n_z > n_y$$

where $n_x$, $n_y$, and $n_z$ are refractive indexes in a direction in which a maximum refractive index is obtained on a plane of said biaxial retardation plates, a direction perpendicular to the direction in which the maximum refractive index is obtained on the plane, and a direction of thickness, respectively.

11. A device according to claim 1, wherein the liquid crystal molecules of said liquid crystal layer are aligned to be twisted at a twist/alignment angle of 80° to 120° from one substrate to the other substrate.

12. A device according to claim 1, further comprising a reflecting plate arranged outside one polarizing plate of said pair of polarizing plates.

13. A color liquid crystal display device comprising:
a pair of substrates having opposing surfaces, electrodes respectively provided thereon and aligning films respectively provided on the opposing surfaces of said substrates to cover said electrodes, said aligning films being subjected to aligning treatments in predetermined directions;

a liquid crystal layer arranged between said pair of substrates and having liquid crystal molecules aligned to be twisted at a twist/alignment angle from one substrate to the other substrate;

a pair of polarizing plates, arranged outside said pair of substrates to sandwich said substrates, for linearly polarizing incident light and analyzing light elliptically polarized by a birefringence function to color exit light;

voltage applying means, connected to said electrodes, for changing a voltage applied to said liquid crystal layer to change an aligned state of the liquid crystal molecules such that a color of the exit light is changed by a change in polarized state of light transmitted through said liquid crystal layer; and at least one complex refracting element arranged between said pair of polarizing plates and having birefringence characteristics, a complex refractive index expressed by a complex number N which satisfies $$N = n - ik$$

where n and k are a refractive index and an absorption coefficient, respectively, and characteristics in which the absorption coefficient k is in inverse proportion to a wavelength of light.

14. A device according to claim 13, wherein the liquid crystal molecules of said liquid crystal layer are aligned to be twisted at a twist-aligned angle of 180° to 270° from one substrate to the other substrate, and a product $\Delta n \cdot d$ of a refractive index anisotropy $\Delta n$ and a liquid crystal layer thickness d is 1,260 nm to 1,460 nm.

15. A device according to claim 14, wherein said complex refracting element satisfies $$N_X > N_Z > N_Y$$

where $N_X$, $N_Y$, and $N_Z$ are complex refractive indexes in a direction in which a maximum refractive index is obtained on a plane of said complex refracting element means, a direction perpendicular to the direction in which the maximum refractive index is obtained on the plane, and a direction of thickness, respectively.

16. A device according to claim 14, further comprising two complex refracting elements arranged between one substrate of said pair of substrates and one of the polarizing plates opposing said one substrate.

17. A device according to claim 14 further comprising a reflecting plate arranged outside one polarizing plate of said pair of polarizing plates.

18. A color liquid crystal display device comprising:
a pair of substrates having opposing surfaces, electrodes respectively provided thereon and aligning films respectively formed on opposing surfaces of said substrates to cover said electrodes, said aligning films being subjected to aligning treatments in predetermined directions;

a liquid crystal layer arranged between said pair of substrates and having liquid crystal molecules aligned to be twisted at a twist/alignment angle from one substrate to the other substrate;

a pair of polarizing plates, arranged on outer sides of said pair of substrates to sandwich said substrates, for linearly polarizing incident light and analyzing light elliptically polarized by a birefringence function to color exit light;

voltage applying means, connected to said electrodes, for changing a voltage applied to said liquid crystal layer to change an aligned state of the liquid crystal molecules such that a color of the exit light is changed by a change in polarized state of light transmitted through said liquid crystal layer; and two biaxial retardation plates which are arranged between one polarizing plate of said pair of polarizing plates and one substrate of said pair of substrates opposing said one polarizing plate and satisfy $$n_X > n_Z > n_Y$$

where $n_X$, $n_Y$, and $n_Z$ are refractive indexes in a direction in which a maximum refractive index is obtained on a plane of said biaxial retardation plates, a direction perpendicular to the direction in which the maximum refractive index is obtained on the plane, and a direction of thickness, respectively.

19. A device according to claim 18, wherein the liquid crystal molecules of said liquid crystal layer are aligned to be twisted at a twist-aligned angle of 180° to 270° from one substrate to the other substrate, and a product $\Delta n \cdot d$ of a refractive index anisotropy $\Delta n$ and a liquid crystal layer thickness d is 1,250 nm to 1,450 nm.

20. A device according to claim 19, further comprising a reflecting plate arranged outside one polarizing plate of said pair of polarizing plates.

21. A color liquid crystal display device comprising:

a pair of substrates having opposing surfaces, electrodes respectively formed on the opposing surfaces and aligning films respectively provided on the opposing surfaces of said substrates to cover said electrodes, said aligning films being subjected to aligning treatments in predetermined directions;

a liquid crystal layer, arranged between said substrates and having liquid crystal molecules which are aligned to be twisted at a twist/alignment angle of 180° to 270° from one substrate to the other substrate;

a pair of polarizing plates, arranged outside of said substrates to sandwich said substrates, for linearly polarizing incident light and analyzing light elliptically polarized by a birefringence function to color exit light;

voltage applying means, connected to said electrodes, for changing a voltage applied to said liquid crystal layer to change an aligned state of the liquid crystal molecules such that a color of the exit light is changed by a change in polarized state of light transmitted through said liquid crystal layer; and color adjusting optical element means, arranged between said polarizing plates and having birefringence characteristics, for adjusting a hue of the exit light, said color adjusting optical element means having two biaxial retardation plates which satisfy $$n_x > n_z > n_y$$

where $n_x$, $n_y$ and $n_z$ are refractive indexes in a direction in which a maximum refractive index is obtained on a plane of said color adjusting optical element means, a direction perpendicular to the direction in which the maximum refractive index is obtained on the plane, and a direction of thickness, respectively.

22. A device according to claim 21, wherein said two biaxial retardation plates are arranged between one substrate of said pair of substrates and one of the two polarizing plates opposing said one substrate.

23. A device according to claim 21, wherein one biaxial retardation plate of said two biaxial retardation plates is arranged between one substrate of said pair of substrates and one of the two polarizing places opposing said one substrate, and the other biaxial retardation plate of the two biaxial retardation plates is arranged between the other substrate of said pair of substrates and the other polarizing plate opposing said other substrate.

24. A color liquid crystal display device comprising:

a pair of substrates having opposing surfaces, electrodes respectively formed on the opposing surfaces and aligning films respectively provided on the opposing surfaces of said substrates to cover said electrodes, said aligning films being subjected to aligning treatments in predetermined directions;

a liquid crystal layer, arranged between said substrates and having liquid crystal molecules which are aligned to be twisted at a twist/alignment angle of 80° to 120° from one substrate to the other substrate;

a pair of polarizing plates, arranged outside of said substrates to sandwich said substrates, for linearly polarizing incident light and analyzing light elliptically polarized by a birefringence function to color exit light;

voltage applying means, connected to said electrodes, for changing a voltage applied to said liquid crystal layer to change an aligned state of the liquid crystal molecules such that a color of the exit light is changed by a change in polarized state of light transmitted through said liquid crystal layer; and color adjusting optical element means, arranged between said polarizing plates and having birefringence characteristics, for adjusting a hue of the exit light, said color adjusting optical element means having a homeotropic liquid crystal cell which is constituted by sealing a liquid crystal material between a second pair of substrates each having an electrode and in which liquid crystal molecules are aligned perpendicularly to the opposing surfaces of said substrates of said second pair of substrates.

25. A color liquid crystal display device comprising:

a pair of substrates having opposing surfaces, electrodes respectively formed on the opposing surfaces and aligning films respectively provided on the opposing surfaces of said substrates to cover said electrodes, said aligning films being subjected to aligning treatments in predetermined directions;

a liquid crystal layer, arranged between said substrates and having liquid crystal molecules which are aligned to be twisted at a twist/alignment angle of 80° to 120° from one substrate to the other substrate;

a pair of polarizing plates, arranged outside of said substrates to sandwich said substrates, for linearly polarizing incident light and analyzing light elliptically polarized by a birefringence function to color exit light;

voltage applying means, connected to said electrodes, for changing a voltage applied to said liquid crystal layer to change an aligned state of the liquid crystal molecules such that a color of the exit light is changed by a change in polarized state of light transmitted through said liquid crystal layer; and color adjusting optical element means, arranged between said polarizing plates and having birefringence characteristics, for adjusting a hue of the exit light, said color adjusting optical element means having a homogeneous liquid crystal cell which is constituted by sealing a liquid crystal material between a second pair of substrates each having an electrode and in which liquid crystal molecules are aligned in parallel with the opposing surfaces of said substrates of said second pair of substrates.

* * * * *